United States Patent
Lauer et al.

(10) Patent No.: US 11,789,812 B2
(45) Date of Patent: Oct. 17, 2023

(54) PULSED STARK TONES FOR COLLISION MITIGATION

(71) Applicant: International Business Machines Corporation, Armonk, NY (US)

(72) Inventors: Isaac Lauer, Chappaqua, NY (US); Neereja Sundaresan, Westchester, NY (US); Emily Pritchett, Mt Kisco, NY (US)

(73) Assignee: International Business Machines Corporation, Armonk, NY (US)

( * ) Notice: Subject to any disclaimer, the term of this patent is extended or adjusted under 35 U.S.C. 154(b) by 39 days.

(21) Appl. No.: 17/526,837

(22) Filed: Nov. 15, 2021

(65) Prior Publication Data
US 2023/0153199 A1 May 18, 2023

(51) Int. Cl.
| | | |
|---|---|---|
| G11C 29/00 | (2006.01) | |
| G06F 11/10 | (2006.01) | |
| G06N 10/00 | (2022.01) | |
| G06N 10/70 | (2022.01) | |

(52) U.S. Cl.
CPC ......... *G06F 11/1048* (2013.01); *G06N 10/00* (2019.01); *G06N 10/70* (2022.01)

(58) Field of Classification Search
CPC ..... G06F 11/1048; G06N 10/00; G06N 10/70
See application file for complete search history.

(56) References Cited

U.S. PATENT DOCUMENTS

| | | |
|---|---|---|
| 6,678,450 B1 | 1/2004 | Franson |
| 9,727,823 B2 | 8/2017 | Amin et al. |
| 10,347,834 B2 | 7/2019 | Thomas et al. |
| 10,552,755 B2 | 2/2020 | Lanting et al. |

(Continued)

FOREIGN PATENT DOCUMENTS

| | | |
|---|---|---|
| CN | 111291891 | 6/2020 |
| CN | 111868755 A | 10/2020 |

(Continued)

OTHER PUBLICATIONS

International Search Report issued for PCT/IB2022/057862 by the China Patent Office, dated Nov. 28, 2022, 6 pgs.

(Continued)

*Primary Examiner* — Samir W Rizk
(74) *Attorney, Agent, or Firm* — Amin, Turocy & Watson, LLP

(57) ABSTRACT

Techniques for using stark tone pulses to mitigate cross-resonance collision in qubits are presented. A tone management component can control application of pulses to qubits by a tone generator component to mitigate undesirable frequency collisions between qubits. The tone generator component (TGC) can apply an off-resonant tone pulse to a qubit during a gate to induce a stark shift. TGC can apply a cross-resonance tone pulse to a control qubit at a frequency associated with the qubit, wherein the frequency can be stark shifted based on the off-resonant tone pulse. The qubit can be a target qubit, the control qubit itself, or a spectator qubit that can be coupled to the target qubit or the control qubit. The gate can be a cross-resonance gate, a two-qubit gate, or a measurement gate that can utilize an echo sequence, a target rotary, or active cancellation.

21 Claims, 11 Drawing Sheets

(56) References Cited

U.S. PATENT DOCUMENTS

| | | | |
|---|---|---|---|
| 10,755,193 B2 | 8/2020 | Kandala et al. | |
| 2018/0260732 A1* | 9/2018 | Bloom | G06N 10/00 |
| 2019/0205784 A1 | 7/2019 | Monroe et al. | |
| 2020/0161529 A1 | 5/2020 | Chow et al. | |
| 2020/0234171 A1 | 7/2020 | Chu et al. | |
| 2020/0272929 A1 | 8/2020 | McKay et al. | |
| 2020/0313063 A1 | 10/2020 | Pollanen et al. | |
| 2020/0341837 A1 | 10/2020 | Cross et al. | |
| 2021/0099201 A1* | 4/2021 | Winick | H04B 3/32 |
| 2021/0241159 A1* | 8/2021 | Heinsoo | G06N 10/40 |
| 2021/0256409 A1 | 8/2021 | Biercuk et al. | |
| 2021/0256410 A1 | 8/2021 | Bravyi et al. | |
| 2021/0258079 A1 | 8/2021 | Lauer et al. | |

FOREIGN PATENT DOCUMENTS

| | | |
|---|---|---|
| CN | 111915012 A | 11/2020 |
| CN | 112769554 A | 5/2021 |
| DE | 19525514 A1 | 1/1997 |
| WO | 2020150348 | 7/2020 |

OTHER PUBLICATIONS

Temme et al., "Error mitigation for short-depth quantum circuits", Physical Review Letters, vol. 119, No. 18, 2017, 15 pages.

Klimov et al., "Fluctuations of energy-relaxation times in superconducting qubits", Physical Review Letters, vol. 121, No. 9, 2018, 21 pages.

Kandala et al., "Error mitigation extends the computational reach of a noisy quantum processor", Nature 567, No. 7749, 2019, pp. 491-495.

Mell et al., "The NIST Definition of Cloud Computing", Recommendations of the National Institute of Standards and Technology, NIST Special Publication 800-145, Sep. 2011, 7 pages.

Magesan et al., "Effective Hamiltonian models of the cross-resonance gate," arXiv:1804.04073v2 [quant-ph] Feb. 25, 2019, 16 pages.

Dicarlo et al., "Demonstration of Two-Qubit Algorithms with a Superconducting Quantum Processor," arXiv:0903.2030 [cond-mat.mes-hall], May 4, 2009, 9 pages.

Sundaresan et al., "Reducing unitary and spectator errors in cross resonance with optimized rotary echoes," arXiv:2007.02925v1 [quant-ph] Jul. 6, 2020, 22 pages.

Jurcevic et al., "Demonstration of quantum vol. 64 on a superconducting quantum computing system," arXiv:2008.08571v2 [quant-ph] Sep. 4, 2020, 7 pages.

Hertzberg et al., "Laser-annealing Josephson junctions for yielding scaled-up superconducting quantum processors," arXiv:2009.00781v4 [quant-ph] Sep. 23, 2020, 16 pages.

* cited by examiner

PULSED STARK TONES FOR COLLISION MITIGATION

BACKGROUND

The subject disclosure relates to quantum circuitry, and more specifically, to pulsed stark tones for collision mitigation.

SUMMARY

The following presents a summary to provide a basic understanding of one or more embodiments of the disclosed subject matter. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, devices, structures, computer-implemented methods, apparatuses, and/or computer program products that can mitigate collisions associated with qubits are provided.

An embodiment relates to a computer-implemented method that comprises applying, by a system operatively coupled to a processor component, an off-resonant tone pulse to a qubit during application of a gate, wherein a frequency associated with the qubit can be stark shifted based on the off-resonant tone pulse, wherein the qubit is a target qubit, a control qubit, or another qubit. The computer-implemented method also can comprise applying, by the system, a cross-resonance tone pulse to the control qubit during the application of the gate.

According to another embodiment, a system can comprise a memory that stores computer-executable components; and a processor component, operatively coupled to the memory, that executes computer-executable components. The computer-executable components can comprise a tone generator component that can apply an off-resonant tone pulse to a qubit during a gate, and can apply a cross-resonance tone pulse to a control qubit during the gate, wherein a frequency associated with the qubit can be stark shifted based on the off-resonant tone pulse, and wherein the qubit is a target qubit, the control qubit, or another qubit.

According to still another embodiment, a computer program product can facilitate mitigating cross-resonance collision associated with qubits. The computer program product can comprise a computer readable storage medium having program instructions embodied therewith. The program instructions can be executable by a processor component to cause the processor component to apply a stark tone pulse to a qubit during a gate, wherein a frequency associated with the qubit can be stark shifted based on the stark tone pulse, and wherein the qubit is a target qubit, a control qubit, or a spectator qubit. The program instructions also can be executable by the processor component to cause the processor component to apply a cross-resonance tone pulse to the control qubit during the gate.

In yet another embodiment, a system can comprise a control qubit coupled to a target qubit, wherein a qubit is driven by an off-resonant tone pulse applied to the qubit during application of a gate, wherein a frequency associated with the qubit is stark shifted based on the off-resonant tone pulse, wherein the qubit is the target qubit, the control qubit, or a spectator qubit coupled to the target qubit or the control qubit; and wherein the control qubit is driven by a cross-resonance tone pulse during the application of the gate.

These and other features will become apparent from the following detailed description of illustrative embodiments thereof, which is to be read in connection with the accompanying drawings.

DETAILED DESCRIPTION

Figure 1:
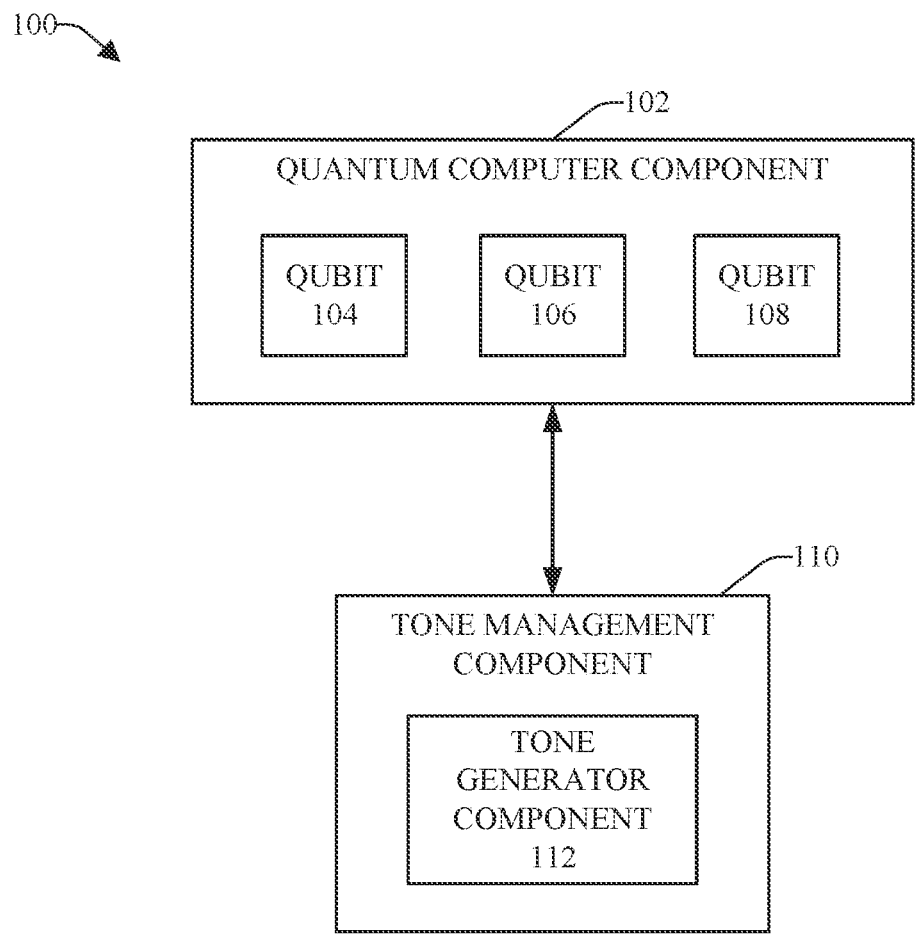
FIG. 1 illustrates a block diagram of an example, non-limiting system that can desirably mitigate frequency collisions associated with qubits of a quantum computer, in accordance with various aspects and embodiments of the disclosed subject matter.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

The subject disclosure relates to quantum computing using quantum circuits. Quantum computing employs quantum physics to encode and process information rather than binary digital techniques based on transistors. A quantum computing device can employ quantum bits (also referred to as qubits) that operate according to the laws of quantum physics and can exhibit phenomena such as superposition and entanglement. The superposition principle of quantum physics allows qubits to be in a state that partially represent both a value of "1" and a value of "0" at the same time. The entanglement principle of quantum physics allows qubits to be correlated with each other such that the combined states of the qubits cannot be factored individual qubit states. For instance, a state of a first qubit can depend on a state of a second qubit. As such, a quantum circuit can employ qubits to encode and process information in a manner that can be significantly different from binary digital techniques based on transistors.

There are different types of qubits. One type of qubit can be a tunable frequency or flux tunable qubit that can comprise or be associated with a superconducting quantum interference device (SQUID) loop that can include a set of Josephson junctions to facilitate performing the functions of the SQUID loop. The frequency of a flux tunable qubit can be adjusted or tuned by changing the magnetic flux passing through the SQUID loop.

One of the drawbacks of flux tunable qubits can be that, to enable adjusting or tuning of a frequency of a flux tunable qubit, a flux generation device, such as an electric coil, is used to generate the magnetic flux that can be applied to the SQUID loop to adjust or tune the frequency of the flux tunable qubit. The flux generation device can comprise flux lines and associated circuitry or wiring, and/or control electronics, at least some of which are located in the cryostat utilized by the quantum computing device to facilitate operation of the qubits, and this can undesirably dissipate heat into the cryostat and/or introduce undesirable noise into the cryostat in proximity to the qubits, which can negatively impact the performance of the qubits.

Another type of qubit can be a fixed frequency qubit. A fixed frequency qubit can comprise a single Josephson junction, rather than a SQUID loop. In contrast to the tunable frequency or flux tunable qubit, which can have its frequency adjusted by changing the magnetic flux passing through the SQUID loop, a fixed frequency qubit can have a fixed frequency that typically cannot be readily or easily changed. The frequency of a fixed frequency qubit is generally stochastically determined by the details of the fabrication process utilized to create the fixed frequency qubit. Fixed frequency qubits can have the advantages of not having to have flux lines, and therefore, fixed frequency qubits can have less wiring or other circuitry or components in the cryostat, can have less control electronics for operation of such qubits than tunable frequency or flux tunable qubits, and are not susceptible to flux noise. Other types of qubits exist as well.

Qubits can be connected (e.g., directly or indirectly connected) to each other in quantum circuitry. The distribution in frequency of connected qubits can be a significant parameter that can affect the performance of a quantum processor comprising such qubits. It can be desirable to have connected qubits relatively close in frequency, but not too close in frequency, and it can be desirable for connected qubits to not be close in frequency with undesired transitions in the quantum system. When qubits are too close in frequency to their neighbor qubit's transitions, this can be referred to as a collision (e.g., frequency collision), which can be undesirable and can negatively impact performance of the qubits and qubit processor. For instance, a collision can be the presence of an undesired transition associated with a qubit that can be driven by the same or substantially same tone that drives a desired transition associated with the qubit.

With regard to a line of three qubits, Q0, Q1, and Q2, there can be, for example, seven different types of collisions associated with that line of three qubits. In the following example types of collisions, qubit frequencies can be represented by f and anharmocities can be represented by a. A first type of collision can be a direct frequency collision between nearest-neighbor qubits, such as, for example, $f_{01,Q0}=f_{01,Q1}$. A second type of collision can be where there is a qubit frequency that can be resonant with the 02/2 of a nearest-neighbor qubit, such as, for example, $2 \times f_{01,Q0}=f_{02,Q1}$. A third type of collision can be where there is a qubit frequency that can be resonant with the 12 of a nearest-neighbor qubit, such as, for example, $f_{01,Q0}=f_{12,Q1}$. A fourth type of collision can be where nearest-neighbor qubits are outside straddling, such as, for example, $|f_{01,Q0}-f_{01,Q1}|>|a|$, which can be referred to as a slow gate collision. A fifth type of collision can be referred to as collision 1 for target qubits that can share the same control qubit, such as where, for example, if Q1 is the control qubit, this collision can occur when Q0 and Q2 have the same frequency $f_{01,Q0}=f_{01,Q2}$. A sixth type of collision can be referred to as collision 3 for target qubits that can share the same control qubit, such as where, for example, if Q1 is the control qubit, this collision can occur when $f_{01,Q0}=f_{12,Q2}$. A seventh type of collision can be when the control qubit 02 frequency is equal to the sum of the target qubit and the spectator qubit 01 frequencies, such as where, for example, if Q0 is the control qubit and Q1 is the target qubit, this collision can occur when $f_{01,Q0}+f_{01,Q2}=f_{02,Q1}$, wherein the spectator qubit can be a qubit that is coupled to either the target qubit or the control qubit.

Collisions can be key yield and performance detractors for fixed frequency qubit architectures. It can be difficult to fabricate chips with large numbers (e.g., sufficiently large numbers) of highly-connected fixed frequency qubits without introducing some undesirable collisions.

Many collisions involving qubits can be "soft" collisions though, where the undesired transition can be several megahertz (MHz) away from the applied drive, can be multiphoton that typically only can be a concern under drive but does not interact with a single photon stored on a qubit, or can be relatively weakly coupled. In these types of "soft" collision cases, having a qubit at a collision frequency typically only may be a significant detriment during active pulsing and/or during a gate. It is not necessary to utilize a continuous drive to correct collisions of these types (e.g., "soft" collisions), and using continuous drive generally can be undesirable because, as disclosed, this typically can negatively impact qubit performance and can undesirably dissipate significant heat into the cryostat.

One approach to dealing with collisions can be to select chips comprising qubits with advantageous frequency spacing for commercial deployment. As a practical matter, however, quantum chip devices may still suffer from some undesirable collisions between qubits that should be addressed and mitigated.

To help deal with collisions, an approach can be to use a microwave source to continuously stark shift qubits that have undesirable (e.g., bad) collisions. A stark shift can involve a frequency shift of a qubit due to an AC Stark effect, also known as an Autler-Townes effect. The effective frequency of a qubit transition can be modified by the presence of an off-resonant oscillating electromagnetic field and/or microwave tone, which can be referred to as a stark tone. However, such approach of continuously stark shifting qubits can undesirably involve having additional electronics and circuitry (e.g., wiring) in order to accommodate the use of the microwave source to continuously stark shift the qubits, and this typically can negatively impact qubit performance and can undesirably dissipate significant heat into the cryostat. For instance, when signals are transmitted between different temperature stages, the signal has to be "thermalized." This can refer to reducing the thermal noise associated with the thermal energy kT of the source stage to closer to the kT of the destination stage. This typically can be achieved by attenuating the signal with a radio frequency (RF) attenuator at the destination stage. The attenuator can reduce both power of the signal and the noise, while introducing some new thermal noise at the kT of the destination stage, resulting in an overall reduction in the noise temperature. The attenuators can be resistive, and thus, can dissipate power. Their temperature can be somewhat elevated compared to the temperature of the destination stage, proportional to the power they are dissipating. When a stark tone is applied (e.g., continuously applied), this extra signal can be attenuated, and thus can cause extra power to be dissipated in the attenuators located at the various temperature stages, which can be undesirable.

It can be desirable to be able to mitigate the effect of collisions, including "soft" collisions, between frequencies of qubits, particularly doing so in a practical and efficient manner. The disclosed subject matter can be implemented to produce a solution to all or at least some of these problems and/or other problems with traditional quantum computing and frequency collisions associated with qubits, including introducing practical, efficient, and desirably implementable procedures that can desirably mitigate frequency collisions associated with qubits. The disclosed subject matter also can reduce electronics, wiring, and/or other components or circuitry utilized inside or outside the cryostat to facilitate performing quantum operations using qubits, and can thereby reduce the amount of heat that is introduced or dissipated into the cryostat and enhance the performance and efficiency of the qubits.

To that end, the various aspects and embodiments herein relate to techniques for using stark tone pulses to mitigate frequency collisions associated with qubits. The disclosed subject matter can comprise a tone management component that can control application of pulses (e.g., cross-resonance tone pulses, off-resonant tone or stark tone pulses, rotary tone pulses, or active cancellation tone pulses) to qubits by a tone generator component to mitigate undesirable frequency collisions (e.g., cross-resonance collisions) associated with qubits of a quantum computer component. The tone generator component can apply an off-resonant tone pulse to a qubit (e.g., target qubit, control qubit, or spectator qubit) during a gate (e.g., during application of the gate) to induce a stark shift, wherein a frequency associated with the qubit can be stark shifted based on the off-resonant tone pulse. Concurrently (e.g., simultaneously or substantially simultaneously) with the application of the off-resonant tone pulse to the qubit, the tone generator component can apply a cross-resonance tone pulse to a control qubit (e.g., during the application of the gate). In accordance with various embodiments, the qubit can be a target qubit, the control qubit itself, or a spectator qubit that can be coupled to the target qubit or the control qubit. The gate can be a cross-resonance gate, a two-qubit gate, or a measurement gate that can utilize an echo sequence, a target rotary, or active cancellation. In the case where the qubit is a target qubit, the application of the cross-resonance tone pulse to the control qubit can be at the frequency (e.g., stark-shifted target frequency) associated with the target qubit.

In some embodiments, the tone management component can manage, implement, or facilitate implementing a stark tone determination procedure to determine desired stark tones and associated desired target frequencies that can be used for qubits (e.g., target qubit) to facilitate mitigating various types of collisions between the control qubit and another associated qubit(s) (e.g., target qubit). For each type of collision to be considered, the tone management component can adjust the target frequency and power of the stark tone (e.g., off-resonant tone) to achieve a desired target frequency that can be separated from the collision by a desired keepout (e.g., that can be separated from the collision by a defined separation amount of frequency). For each type of collision, the tone management component can adjust the frequency of the cross-resonance tone to the stark-shifted target frequency, and can perform a fine adjustment of the frequency of the frequency of the cross-resonance tone to eliminate or reduce an IZ error to within a defined threshold tolerance amount of IZ error. For each type of collision, the tone management component can calibrate the cross-resonance gate using a desired calibration process. For each type of collision, the tone management component also can evaluate the fidelity of the stark tone and associated target frequency, and, as desired, can iterate over potential target frequencies until the desired (e.g., acceptable, suitable, or optimal) target frequency is achieved, in accordance with defined tone management criteria.

These and other aspects and embodiments of the disclosed subject matter will now be described with respect to the drawings.

FIG. 1 illustrates a block diagram of an example, non-limiting system 100 that can desirably mitigate frequency collisions (e.g., cross-resonance collisions) associated with qubits of a quantum computer, in accordance with various aspects and embodiments of the disclosed subject matter. The system 100 can comprise a quantum computer component 102 that can include various quantum devices, quantum circuitry, and/or other components. The quantum devices can comprise, for example, a desired number of qubit components (also referred to herein as qubits), such as, for example, qubit 104, qubit 106, and qubit 108. The qubits can be arranged in relation to each other, as desired. In accordance with various embodiments, qubit 104, qubit 106, and qubit 108 can be arranged in line with each other or can otherwise be arranged in proximity to each other. While three qubits (e.g., 104, 106, and 108) are shown in the quantum computer component 102 for illustrative purposes, and for reasons of brevity or clarity, it is to be appreciated and understood that the quantum computer component 102 can comprise a desired number of qubits that can be more (e.g., significantly more) than three qubits. The quantum computer component 102 can be programmed and desired quantum circuits, comprising qubits (e.g., 104, 106, and 108) and other quantum devices, circuitry, and components, can be formed, for example, based on, a set of instructions (e.g., assembled sequence of instructions) that can be input to and run (e.g., executed) on the quantum computer component 102 to create and operate desired quantum circuits, wherein the structure of the quantum circuits, and operations (e.g., quantum operations) performed by the quantum circuits, can be based on the set of instructions. In response to execution of a quantum program, comprising or associated with the set of instructions and/or comprising input data or parameter data, and operation of the quantum circuits based on such quantum program, the quantum computer component 102 can produce results (e.g., data results), which also can be referred to as readout results or readout determinations. The quantum computer component 102 can present (e.g., communicate or transmit) the results as an output.

There potentially can be undesirable collisions (e.g., frequency or cross-resonance collisions) between qubits (e.g., qubits in proximity to each other and/or coupled to each other), as more fully described herein. It can be desirable to be able to mitigate the effect of collisions, in particular, "soft" collisions, between frequencies of qubits, and doing so in a practical and efficient manner. The disclosed subject matter (e.g., system 100) can be implemented to mitigate (e.g., reduce or eliminate) frequency collisions associated with qubits, including introducing practical, efficient, and desirably implementable procedures that can desirably mitigate frequency collisions associated with qubits. The disclosed subject matter also can reduce electronics, wiring, and/or other components or circuitry utilized inside or outside the cryostat (e.g., cryostat of or associated with the quantum computer) to facilitate performing quantum operations using qubits.

To facilitate desirably mitigating undesirable frequency collisions between qubits, and to do so in an efficient manner, the system 100 can comprise a tone management component (TMC) 110 that can be associated with (e.g., communicatively connected to) the quantum computer component 102. The TMC 110 can comprise a tone generator component (TGC) 112 that can generate desired tones, such as tone pulses, that can be applied to desired qubits (e.g., 104, 106, and 108) to facilitate performing various operations (e.g., quantum operations). The TMC 110 can control (e.g., manage, adjust, or adapt) application of tone pulses (e.g., cross-resonance (CR) tone pulses, off-resonant tone or stark tone pulses, rotary tone pulses, or active cancellation tone pulses) to qubits (e.g., 104, 106, and 108) by the TGC 112 to mitigate undesirable frequency collisions (e.g., cross-resonance collisions) associated with qubits of the quantum computer component 102, in accordance with defined tone management criteria. With regard to each type of tone pulse (e.g., CR tone pulse, off-resonant tone or stark tone pulse, rotary tone pulse, or active cancellation tone pulse), the TMC 110 can control, determine, or adapt a length of the pulse, a timing of the application of the pulse to a qubit, a tone frequency of the pulse, a power (e.g., an amount or level of power) of the pulse, an amplitude of the pulse, and/or other characteristics or features of the pulse, in accordance with the defined tone management criteria, as more fully described herein. In some embodiments, the TMC 110 can manage, implement, or facilitate implementing a stark tone determination procedure to determine desired stark tones and associated desired target frequencies that can be used for qubits (e.g., target qubit) to facilitate mitigating various types of collisions between the control qubit and another associated qubit(s) (e.g., target qubit), as more fully described herein.

At various times, a qubit (e.g., 104, 106, or 108) can be a control qubit, a target qubit, or a spectator qubit, wherein a spectator qubit can be a qubit that can be coupled to the target qubit or the control qubit. As described herein, qubit 104 frequently can be referred to as a control qubit, qubit 106 frequently can be referred to as a target qubit, and qubit 108 frequently can be referred to as a spectator qubit. However, it is to be appreciated and understood that, in accordance with various embodiments, at various given times, and during various given operations, as appropriate for an operation, the qubit 104 can be a control qubit, a target qubit, or a spectator qubit; the qubit 106 can be a control qubit, a target qubit, or a spectator qubit (e.g., one of these qubit types that can be different from the type of qubit that the qubit 104 is); and the qubit 108 can be a control qubit, a target qubit, or a spectator qubit (e.g., one of these qubit types that can be different from the type of qubit that the qubit 104 is and the type of qubit that the qubit 106 is).

As controlled by the TMC 110, in connection with a gate, the TGC 112 can apply a desired off-resonant tone pulse (also referred to herein as a stark tone pulse) to a qubit (e.g., target qubit (e.g., qubit 106), control qubit (e.g., qubit 104), or spectator qubit (e.g., qubit 108)) during a gate (e.g., during application of the gate) to induce a stark shift, wherein a frequency associated with the qubit can be stark shifted based on the off-resonant tone pulse. The off-resonant tone pulse can have a desired frequency, power level, amplitude, pulse length, or other characteristic. As a non-limiting example, the off-resonant tone pulse can have a pulse frequency that can range from approximately 4.0 to 6.0 GHz, an amplitude (e.g., relative amplitude) of approximately 0.5, and a pulse length of approximately 50 nanoseconds (ns) to 1000 ns in instances where the gate utilizes a target rotary and/or active cancellation and approximately 25 ns to 500 ns in instances where the gate utilizes an echo sequence, wherein the pulse length of the off-resonant tone pulse can be the same length as the CR tone pulse. It is to be appreciated and understood that these are example parameter values and, if and as desired, the pulse frequency, amplitude, and pulse length of an off-resonant tone pulse can be greater or lesser than these example parameter values (e.g., when in accordance with the defined tone management criteria).

Concurrently (e.g., simultaneously or substantially simultaneously) with the application of the off-resonant tone pulse to the qubit, the TGC 112 can apply a desired CR tone pulse to a control qubit (e.g., qubit 104). The CR tone pulse can have a desired frequency, power level, amplitude, pulse length, or other characteristic, and can be different from the off-resonant tone pulse. As a non-limiting example, the CR tone pulse can have a pulse frequency that can range from approximately 4.0 to 6.0 GHz, an amplitude of approximately 1.0, and a pulse length of approximately 50 nanoseconds (ns) to 1000 ns in instances where the gate utilizes a target rotary and/or active cancellation and approximately 25 ns to 500 ns in instances where the gate utilizes an echo sequence. It is to be appreciated and understood that these are example parameter values and, if and as desired, the pulse frequency, amplitude, and pulse length of a CR tone pulse can be greater or lesser than these example parameter values (e.g., when in accordance with the defined tone management criteria). In accordance with various embodiments, the gate can be a cross-resonance gate, a two-qubit gate, or a measurement gate that can utilize an echo sequence, a target rotary, or active cancellation, as more fully described herein. In the case where the qubit is a target qubit (e.g., target qubit 106), the application of the CR tone pulse to the control qubit 104 can be at the frequency (e.g., stark-shifted target frequency) associated with the target qubit 106.

When target rotary is employed, as a non-limiting example, a rotary tone pulse can have a pulse frequency that can range from approximately 4.0 to 6.0 GHz, an amplitude of approximately 0.05, and a pulse length of approximately 50 nanoseconds (ns) to 1000 ns. It is to be appreciated and understood that these are example parameter values and, if and as desired, the pulse frequency, amplitude, and pulse length of a rotary tone pulse can be greater or lesser than these example parameter values (e.g., when in accordance with the defined tone management criteria). When active cancellation is employed, as a non-limiting example, an active cancellation tone pulse can have a pulse frequency that can range from approximately 4.0 to 6.0 GHz, an amplitude of approximately 0.01, and a pulse length of approximately 50 nanoseconds (ns) to 1000 ns. It is to be appreciated and understood that these are example parameter values and, if and as desired, the pulse frequency, amplitude, and pulse length of an active cancellation tone pulse can be greater or lesser than these example parameter values (e.g., when in accordance with the defined tone management criteria). When employed, a tone pulse, such as a single qubit pi pulse, for example, can have a pulse frequency that can range from approximately 4.0 to 6.0 GHz, an amplitude of approximately 0.2, and a pulse length of approximately 10 nanoseconds (ns) to 100 ns. It is to be appreciated and understood that these are example parameter values and, if and as desired, the pulse frequency, amplitude, and pulse length of such a tone pulse can be greater or lesser than these example parameter values (e.g., when in accordance with the defined tone management criteria).

Figure 2:
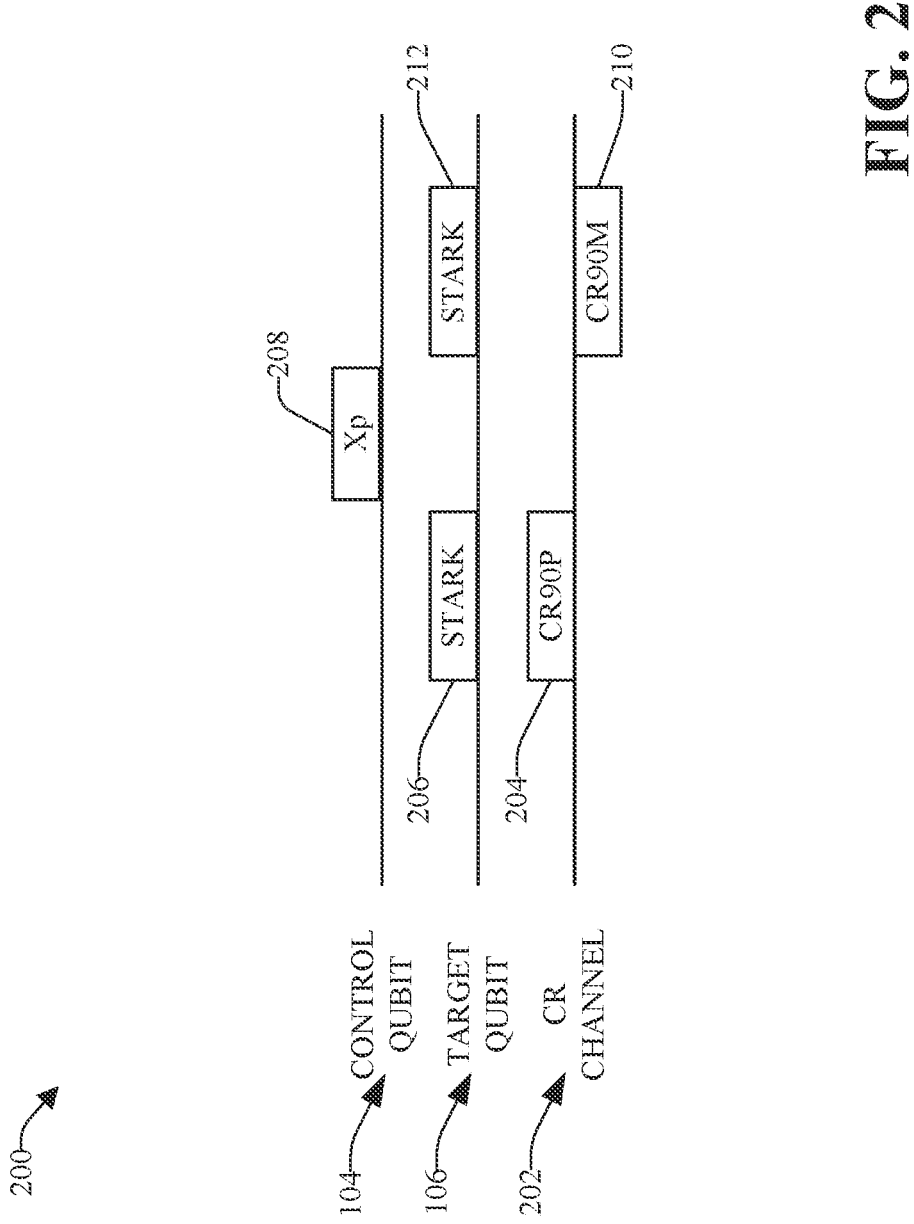
FIG. 2 depicts a block diagram of an example echoed cross-resonance gate where stark tone pulses can be utilized to facilitate mitigating a collision between a control qubit and target qubit, in accordance with various aspects and embodiments of the disclosed subject matter.

Referring to FIG. 2 (along with FIG. 1), FIG. 2 depicts a block diagram of an example echoed cross-resonance gate 200 where stark tone pulses can be utilized to facilitate mitigating a collision between the control qubit 104 and target qubit 106, in accordance with various aspects and embodiments of the disclosed subject matter. In connection with the echoed cross-resonance gate 200, there can be a control qubit 104, target qubit 106, and CR channel 202, which can have respective tone pulses applied to them at respective times of the cross-resonance gate 200. In addition to the tone pulse (e.g., Xp) shown as being applied to the control qubit 104, the signal (e.g., tone pulses) of the CR channel 202 also can be applied to the control qubit 104, although, for illustrative purposes, the CR channel 202 and associated signal are shown separately because the CR channel 202 can have different properties, with one property being that the frequency of the signal of the CR channel 202 can be at the frequency of the target qubit 106. With regard to the control qubit 104, the tone pulses applied to the control qubit 104 can be assumed to be at the 0,1 state transition frequency of the control qubit 104, unless otherwise indicated. It is noted that, while these tone pulses associated with the echoed cross-resonance gate 200 are illustrated as blocks, these tone pulses can be respectively oscillating at respective frequencies. The height of the blocks (e.g., tone pulses as represented by blocks) generally can represent the respective amplitudes of the respective tone pulses, although the respective blocks in FIG. 2 (and the other drawings herein that contain tone pulses represented by blocks) are not drawn to represent any particular amplitude or any amplitude size relationship between respective pulses, but are merely presented to illustrate that there is a tone pulse that has some defined amplitude.

During a first time period (e.g., $t_1$) of the cross-resonance gate 200, the TMC 110 can control the TGC 112 to generate a desired CR tone pulse 204 (e.g., CR90P), which can have a positive (P) phase, and a desired stark tone pulse 206 (e.g., stark), and apply the desired CR tone pulse 204 via the CR channel 202 to the control qubit 104 and apply the desired stark tone pulse 206 to the target qubit 106, wherein the stark tone pulse 206 can be applied to the target qubit 106 concurrently or substantially concurrently with the application of the desired CR tone pulse 204 to the control qubit 104. The length (e.g., pulse length) of the CR tone pulse 204 and stark tone pulse 206 can be determined (e.g., by the TMC 110), in accordance with the defined tone management criteria, wherein the pulse length of the stark tone pulse 206 typically can correspond to (e.g., can be same as or substantially the same as) the pulse length of the CR tone pulse 204. In some embodiments, the stark tone pulse 206 can be an off-resonant pulse in relation to the tone pulse 208 (e.g., Xp) that is to be applied to the control qubit 104. The application of the stark tone pulse 206 to the target qubit 106 can induce a stark shift (e.g., temporary stark shift) to the frequency of the target qubit 106, which can change (e.g., alter, adjust, or modify)—at least temporarily change—the transition frequency of the target qubit 106. When the CR tone pulse 204 is applied to the control qubit 104, the CR tone pulse 204 can be at the frequency of the target qubit 106 while the target qubit 106 is stark shifted based on the stark tone pulse 206 (e.g., off-resonant tone pulse). Generally, the higher the amplitude of the stark tone pulse 206, the larger the frequency shift (e.g., stark shift of the frequency) that can be induced in the target qubit 106. The stark shifting of the frequency of the target qubit 106 during the cross-resonance gate 200 can desirably mitigate collision between the target qubit 106 and the control qubit 104.

During a second time period (e.g., a time period $t_2$ subsequent to time period $t_1$) of the cross-resonance gate 200, with the stark shift being induced at the target qubit 106, the TMC 110 can control the TGC 112 to generate a desired tone pulse 208 (e.g., Xp) and apply the desired tone pulse 208 to the control qubit 104. The "p" in Xp can indicate that the tone pulse 208 can perform a pi rotation of the control qubit 104 by the application of the tone pulse 208 at the transition frequency of the control qubit 104 (in contrast to the "P" of the CR90P pulse, where "P" can indicate a positive phase). The application of the desired tone pulse 208 to the control qubit 104 essentially can invert the state of the control qubit 104.

During a third time period (e.g., a time period $t_3$ subsequent to time period $t_2$) of the cross-resonance gate 200, after the desired tone pulse 208 (e.g., Xp) has been applied to the control qubit 104, the TMC 110 can control the TGC 112 to generate another desired CR tone pulse 210 (e.g., CR90M), which can have a negative or minus (M) phase, and another desired stark tone pulse 212, and apply this other desired CR tone pulse 210 via the CR channel 202 to the control qubit 104 and apply the other desired stark tone pulse 212 to the target qubit 106, wherein the stark tone pulse 212 can be applied to the target qubit 106 concurrently or substantially concurrently with the application of the CR tone pulse 210 to the control qubit 104. This other CR tone pulse 210 (e.g., CR90M) can be 180 degrees out of phase with the CR tone pulse 204 (e.g., CR90P) to facilitate completion of the cross-resonance gate 200. It can be desirable (e.g., useful, suitable, wanted, necessary, or required) for the CR tone pulses to have phase coherence pulse-to-pulse (e.g., for the CR tone pulse 210 to have phase coherence with the CR tone pulse 204). The stark tone pulses do not have to have phase coherence pulse-to-pulse (e.g., stark tone pulse 212 does not have to have phase coherence with stark tone pulse 206).

The pulse length of the CR tone pulse 210 and stark tone pulse 212 can be determined (e.g., by the TMC 110), in accordance with the defined tone management criteria, wherein the pulse length of the stark tone pulse 212 typically can correspond to the pulse length of the CR tone pulse 210. In some embodiments, the stark tone pulse 212 can be an off-resonant pulse in relation to the tone pulse 208 (e.g., Xp) that is applied to the control qubit 104. Similar to the stark tone pulse 206 previously applied, the application of the stark tone pulse 212 to the target qubit 106 can induce a stark shift (e.g., temporary stark shift) to the frequency of the target qubit 106, which can change (e.g., temporarily change) the transition frequency of the target qubit 106. When the CR tone pulse 210 (e.g., CR90M) is applied to the control qubit 104, the CR tone pulse 210 can be at the frequency of the target qubit 106 while the target qubit 106 is stark shifted based on the stark tone pulse 212. As described herein, the stark shifting of the frequency of the target qubit 106 during the cross-resonance gate 200 can desirably mitigate (e.g., reduce or eliminate) collision between the target qubit 106 and the control qubit 104 during the gate.

Figure 3:
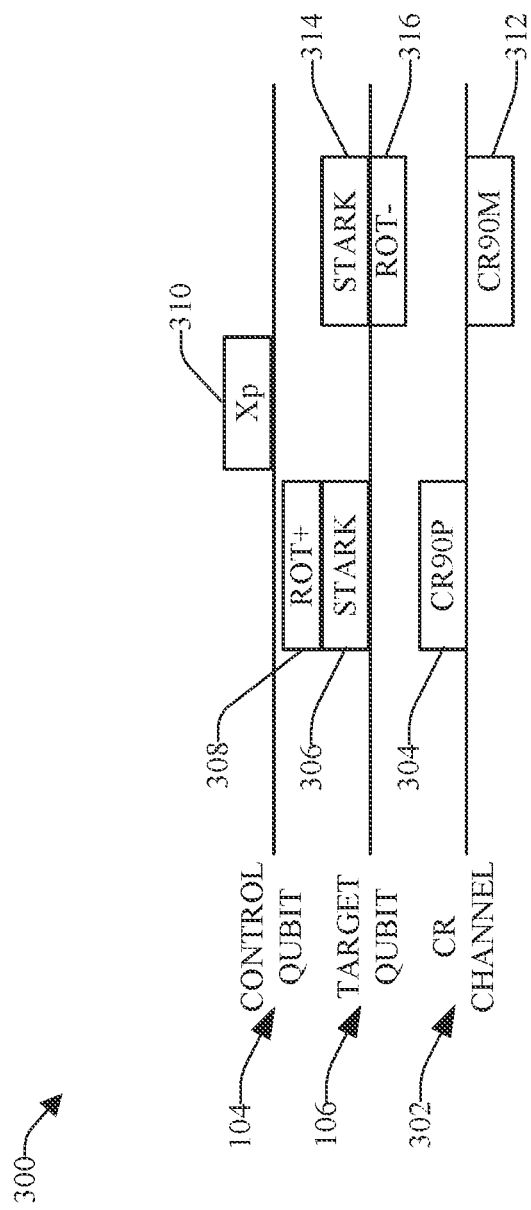
FIG. 3 illustrates a block diagram of an example cross-resonance gate that can employ rotary tone pulses, where stark tone pulses can be utilized to facilitate mitigating a collision between a control qubit and target qubit, in accordance with various aspects and embodiments of the disclosed subject matter.

Turning to FIG. 3 (along with FIG. 1), FIG. 3 illustrates a block diagram of an example cross-resonance gate 300 that can employ rotary tone pulses, where stark tone pulses can be utilized to facilitate mitigating a collision between the control qubit 104 and target qubit 106, in accordance with various aspects and embodiments of the disclosed subject matter. Utilizing rotary tone pulses during the cross-resonance gate 300 can facilitate improving performance of the cross-resonance gate 300. In connection with the cross-resonance gate 300, there can be a control qubit 104, target qubit 106, and CR channel 302, which can have respective tone pulses applied to them at respective times of the cross-resonance gate 300. In addition to the tone pulse (e.g., Xp) shown as being applied to the control qubit 104, the signal (e.g., tone pulses) of the CR channel 302 also can be applied to the control qubit 104. As described herein, one property of the CR channel 302 can be that the frequency of the signal of the CR channel 302 can be at the frequency of the target qubit 106.

During a first time period (e.g., $t_1$) of the cross-resonance gate 300, the TMC 110 can control the TGC 112 to generate a desired CR tone pulse 304 (e.g., CR90P), which can have a positive (P) phase, a desired stark tone pulse 306 (e.g., stark), and a desired rotary tone pulse 308 (e.g., ROT+), apply the desired CR tone pulse 304 via the CR channel 302 to the control qubit 104, and apply the desired stark tone pulse 306 and desired rotary tone pulse 308 to the target qubit 106, wherein the stark tone pulse 306 and rotary tone pulse 308 can be applied to the target qubit 106 concurrently or substantially concurrently with the application of the desired CR tone pulse 304 to the control qubit 104. The lengths (e.g., pulse lengths) of the CR tone pulse 304, stark tone pulse 306, and rotary tone pulse 308 can be determined (e.g., by the TMC 110), in accordance with the defined tone management criteria, wherein the pulse lengths of the CR tone pulse 304, stark tone pulse 306, and rotary tone pulse 308 typically can correspond to each other. In some embodiments, the stark tone pulse 306 can be an off-resonant pulse in relation to the tone pulse 310 (e.g., Xp) that is to be applied to the control qubit 104.

The application of the stark tone pulse 306 to the target qubit 106 can induce a stark shift (e.g., temporary stark shift) to the frequency of the target qubit 106, which can change (e.g., temporarily change) the transition frequency of the target qubit 106. When the CR tone pulse 304 is applied to the control qubit 104, and the rotary tone pulse 308 is applied to the target qubit 106, the CR tone pulse 304 and the rotary tone pulse 308 each can be at the frequency of the target qubit 106 while the target qubit 106 is stark shifted based on the stark tone pulse 306 (e.g., off-resonant tone pulse). The rotary tone pulse 308 is being applied to the target qubit 106 at the target qubit resonant frequency, so the rotary tone pulse 308 can be a resonant tone.

During a second time period (e.g., time period $t_2$ subsequent to time period $t_1$) of the cross-resonance gate 300, with the stark shift being induced at the target qubit 106, the TMC 110 can control the TGC 112 to generate a desired tone pulse 310 (e.g., Xp) and apply the desired tone pulse 310 to the control qubit 104. The tone pulse 310 can perform a pi rotation of the control qubit 104 by the application of the tone pulse 310 at the transition frequency of the control qubit 104. The application of the desired tone pulse 310 to the control qubit 104 essentially can invert the state of the control qubit 104.

During a third time period (e.g., a time period $t_3$ subsequent to time period $t_2$) of the cross-resonance gate 300, after the desired tone pulse 310 (e.g., Xp) has been applied to the control qubit 104, the TMC 110 can control the TGC 112 to generate another desired CR tone pulse 312 (e.g., CR90M), which can have a negative or minus (m) phase, another desired stark tone pulse 314 (e.g., another off-resonant tone pulse), and another desired rotary tone pulse 316 (e.g., ROT−), apply this other desired CR tone pulse 312 via the CR channel 302 to the control qubit 104, and apply the other desired stark tone pulse 314 and other desired rotary tone pulse 316 to the target qubit 106, wherein the stark tone pulse 314 and rotary tone pulse 316 can be applied to the target qubit 106 concurrently or substantially concurrently with the application of the CR tone pulse 312 to the control qubit 104. This other CR tone pulse 312 (e.g., CR90M) can be 180 degrees out of phase with the CR tone pulse 304 (e.g., CR90P) to facilitate completion of the cross-resonance gate 300. The other rotary tone pulse 316 (e.g., ROT−) can be 180 degrees out of phase with the rotary tone pulse 308 (e.g., ROT+). It can be desirable (e.g., useful, suitable, wanted, necessary, or required) for the CR tone pulses and the rotary tone pulses to have phase coherence pulse-to-pulse (e.g., for the CR tone pulse 312 to have phase coherence with the CR tone pulse 304; and or the rotary tone pulse 316 to have phase coherence with rotary tone pulse 308). The stark tone pulses do not have to have phase coherence pulse-to-pulse (e.g., stark tone pulse 314 does not have to have phase coherence with stark tone pulse 306).

The pulse lengths of the CR tone pulse 312, stark tone pulse 314, and rotary tone pulse 316 can be determined (e.g., by the TMC 110), in accordance with the defined tone management criteria, wherein the pulse lengths of the CR tone pulse 312, stark tone pulse 314, and rotary tone pulse 316 typically can correspond to each other. Similar to the stark tone pulse 306 previously applied, the application of the stark tone pulse 314 to the target qubit 106 can induce a stark shift (e.g., temporary stark shift) to the frequency of the target qubit 106, which can change (e.g., temporarily change) the transition frequency of the target qubit 106. When the CR tone pulse 312 (e.g., CR90M) is applied to the control qubit 104, and the rotary tone pulse 316 (e.g., ROT−) is applied to the target qubit 106, the CR tone pulse 312 and the rotary tone pulse 316 each can be at the frequency of the target qubit 106 while the target qubit 106 is stark shifted based on the stark tone pulse 314. The rotary tone pulse 316 is being applied to the target qubit 106 at the target qubit resonant frequency, so the rotary tone pulse 316 can be a resonant tone. As described herein, the stark shifting of the frequency of the target qubit 106 during the cross-resonance gate 300 can desirably mitigate (e.g., reduce or eliminate) collision between the target qubit 106 and the control qubit 104 during the gate.

Figure 4:
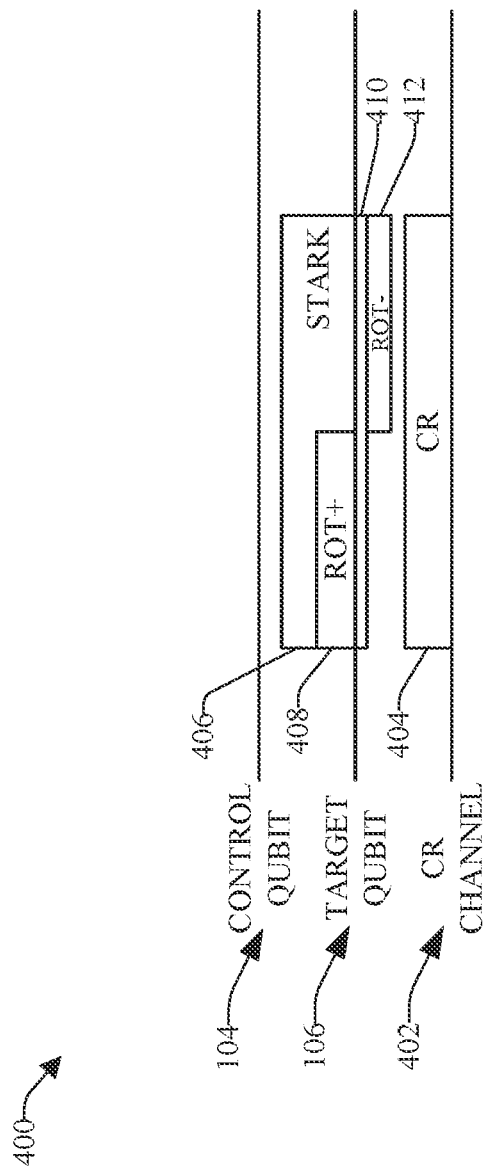
FIG. 4 depicts a block diagram of an example cross-resonance gate that can be a direct controlled NOT (CNOT) gate and can employ rotary tone pulses and an active cancellation pulse, where a stark tone pulse can be utilized to facilitate mitigating a collision between the control qubit and target qubit, in accordance with various aspects and embodiments of the disclosed subject matter.

Referring to FIG. 4 (along with FIG. 1), FIG. 4 depicts a block diagram of an example cross-resonance gate 400 that can be a direct controlled NOT (CNOT) gate and can employ rotary tone pulses and an active cancellation pulse, where a stark tone pulse can be utilized to facilitate mitigating a collision between the control qubit 104 and target qubit 106, in accordance with various aspects and embodiments of the disclosed subject matter. In connection with the cross-resonance gate 400, there can be a control qubit 104, target qubit 106, and CR channel 402, which can have respective tone pulses applied to them at respective times of the cross-resonance gate 400. During the cross-resonance gate 400, the signal (e.g., tone pulse) of the CR channel 402 also can be applied to the control qubit 104. One property of the CR channel 402 can be that the frequency of the signal of the CR channel 402 can be at the frequency of the target qubit 106, such as described herein.

During a first time period (e.g., $t_1$) of the cross-resonance gate 400, the TMC 110 can control the TGC 112 to generate a desired CR tone pulse 404 (e.g., CR), a desired stark tone pulse 406 (e.g., stark), a desired rotary tone pulse 408 (e.g., ROT+), and a desired active cancellation pulse 410, apply the desired CR tone pulse 404 via the CR channel 402 to the control qubit 104, and apply the desired stark tone pulse 406, desired rotary tone pulse 408, and active cancellation pulse 410 to the target qubit 106, wherein the stark tone pulse 406, rotary tone pulse 408, and active cancellation pulse 410 can be applied to the target qubit 106 concurrently or substantially concurrently with the application of the CR tone pulse 404 to the control qubit 104. The respective lengths (e.g., pulse lengths) of the CR tone pulse 404, stark tone pulse 406, rotary tone pulse 408, and active cancellation pulse 410 can be determined (e.g., by the TMC 110), in accordance with the defined tone management criteria, wherein the pulse lengths of the CR tone pulse 404, stark tone pulse 406, and active cancellation pulse 410 typically can correspond to each other and can extend from the beginning of the first time period (e.g., $t_1$) through the end of the second time period (e.g., $t_2$), whereas the rotary tone pulse 408 typically can have a pulse length that can extend for or correspond to the length of the first time period.

During a second time period (e.g., a time period $t_2$ subsequent to time period $t_1$) of the cross-resonance gate 400 (e.g., direct CNOT gate), the TMC 110 can control the TGC 112 to generate another desired another desired rotary tone pulse 412 (e.g., ROT−), apply this other desired rotary tone pulse 412 to the target qubit 106 while the stark tone pulse 406 and active cancellation pulse 410 continue to be applied to the target qubit 106. This other rotary tone pulse 412 (e.g., ROT−) can be 180 degrees out of phase with the rotary tone pulse 408 (e.g., ROT+). It can be desirable (e.g., useful, suitable, wanted, necessary, or required) for the rotary tone pulses to have phase coherence pulse-to-pulse (e.g., for the rotary tone pulse 412 to have phase coherence with rotary tone pulse 408).

The application of the stark tone pulse 406 to the target qubit 106 can induce a stark shift (e.g., temporary stark shift) to the frequency of the target qubit 106, which can change (e.g., temporarily change) the transition frequency of the target qubit 106, such as described herein. When the rotary tone pulse 408 is applied to the target qubit 106 during the first time period, the active cancellation pulse is applied to the target qubit 106 during the first and second time periods, and the other rotary tone pulse 412 is applied to the target qubit 106 during the second time period, the rotary tone pulse 408, active cancellation pulse 410, and other rotary tone pulse 412 each can be at the frequency of the target qubit 106 while the target qubit 106 is stark shifted based on the stark tone pulse 406 (e.g., off-resonant tone pulse). The stark shifting of the frequency of the target qubit 106 during the cross-resonance gate 400 can desirably mitigate (e.g., reduce or eliminate) collision between the target qubit 106 and the control qubit 104 during the gate, such as described herein.

Figure 5:
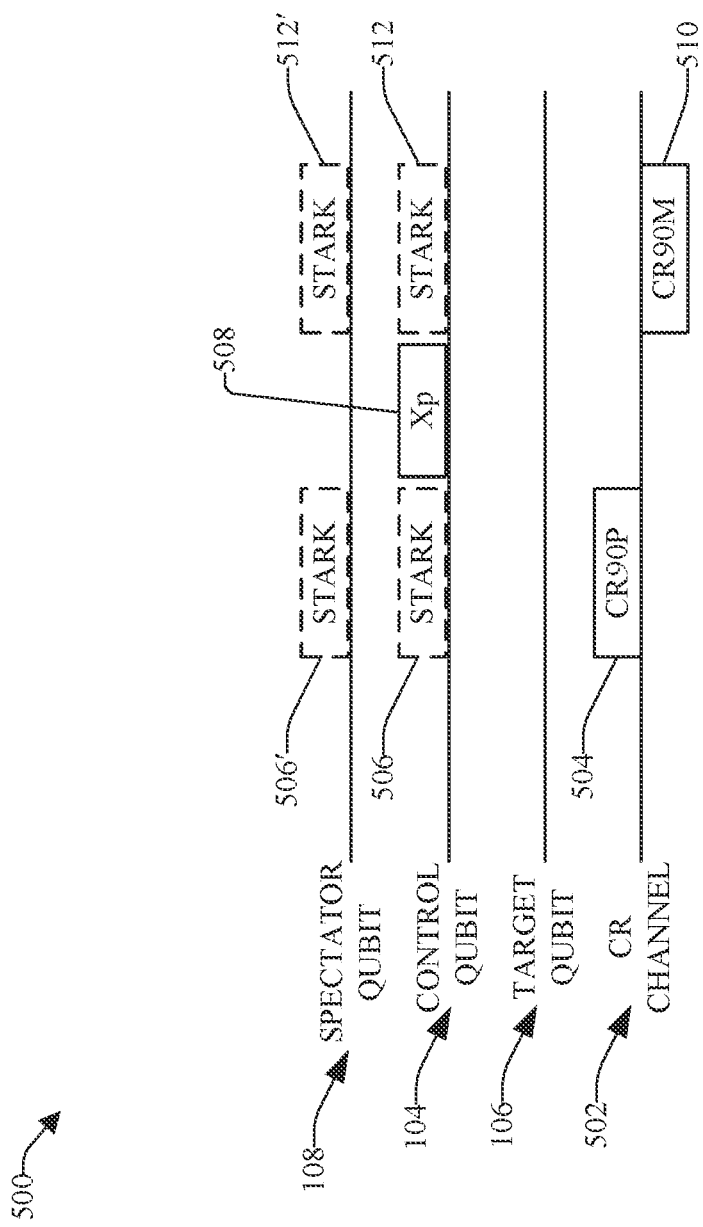
FIG. 5 depicts a block diagram of an example echoed cross-resonance gate where stark tone pulses can be applied to a control qubit or a spectator qubit to facilitate mitigating a collision between the control qubit and a target qubit, in accordance with various aspects and embodiments of the disclosed subject matter.

In accordance with various other embodiments, if and as desired, as an alternative to, or in addition to, applying the stark tone pulses to the target qubit 106, the TMC 110 can control the application of stark tone pulses to apply stark tone pulses to the control qubit 104 during a gate or to a spectator qubit 108 during a gate. In that regard, referring to FIG. 5 (along with FIGS. 1 and 2), FIG. 5 depicts a block diagram of an example echoed cross-resonance gate 500 where stark tone pulses can be applied to the control qubit 104 or the spectator qubit 108 to facilitate mitigating a collision between the control qubit 104 and target qubit 106, in accordance with various aspects and embodiments of the disclosed subject matter. In connection with the echoed cross-resonance gate 500, there can be a control qubit 104, target qubit 106, spectator qubit 108, and CR channel 502, wherein all or at least some of them can have respective tone pulses applied to them at respective times of the cross-resonance gate 500. In addition to the tone pulse (e.g., Xp) shown as being applied to the control qubit 104, the signal (e.g., tone pulses) of the CR channel 502 also can be applied to the control qubit 104. The cross-resonance gate 500 can be similar in many ways to the cross-resonance gate 200 described with regard to FIG. 2, except that, with regard to the cross-resonance gate 500, the stark tone pulses can be applied to the control qubit 104 to stark shift the control qubit 104 or to the spectator qubit 108 to stark shift the spectator qubit 108, instead of applying stark tone pulses to the target qubit 106, such as described with regard to the cross-resonance gate 200 of FIG. 2 (although, in certain embodiments, stark tone pulses can be applied to the target qubit 106 as well, if and as desired).

During the first time period (e.g., $t_1$) of the cross-resonance gate 500, the TMC 110 can control the TGC 112 to generate a desired CR tone pulse 504 (e.g., CR90P), which can have a positive (P) phase, and a desired stark tone pulse 506 (e.g., stark) or desired stark tone pulse 506', and apply the desired CR tone pulse 504 via the CR channel 202 to the control qubit 104 and apply (e.g., concurrently apply) the desired stark tone pulse 506 (e.g., off-resonant pulse) to the control qubit 104 or the desired stark tone pulse 506' to the spectator qubit 108. The application of the stark tone pulse 506 to the control qubit 104 or the stark tone pulse 506' to the spectator qubit 108 can induce a stark shift (e.g., temporary stark shift) to the frequency of the control qubit 104 or the spectator qubit 108, respectively. Such stark shifting of the frequency of the control qubit 104 or the frequency of the spectator qubit 108 during the cross-resonance gate 500 can desirably mitigate (e.g., reduce or eliminate) collision between the target qubit 106 and the control qubit 104 during the gate.

During a second time period (e.g., a time period $t_2$ subsequent to time period $t_1$) of the cross-resonance gate 500, with the stark shift being induced at the control qubit 104 or the spectator qubit 108, the TMC 110 can control the TGC 112 to generate a desired tone pulse 508 (e.g., Xp) and apply the desired tone pulse 508 to the control qubit 104. The application of the desired tone pulse 508 to the control qubit 104 essentially can invert the state of the control qubit 104.

During a third time period (e.g., a time period $t_3$ subsequent to time period $t_2$) of the cross-resonance gate 500, after the desired tone pulse 508 (e.g., Xp) has been applied to the control qubit 104, the TMC 110 can control the TGC 112 to generate another desired CR tone pulse 510 (e.g., CR90M), which can have a negative or minus (M) phase, and another desired stark tone pulse 512 or stark tone pulse 512', and apply this other desired CR tone pulse 510 via the CR channel 502 to the control qubit 104 and apply (e.g., concurrently apply) the other desired stark tone pulse 512 to the control qubit 104 or the other desired stark tone pulse 512' to the spectator qubit 108. This other CR tone pulse 510 (e.g., CR90M) can be 180 degrees out of phase with the CR tone pulse 504 (e.g., CR90P) to facilitate completion of the cross-resonance gate 500. As described herein, it can be desirable for the CR tone pulses to have phase coherence pulse-to-pulse. The stark tone pulses (e.g., 506, 506', 512, or 512') do not have to have phase coherence pulse-to-pulse though. The stark shifting of the frequency of the control qubit 104 or the frequency of the spectator qubit 108 during the cross-resonance gate 500 can desirably mitigate collision between the target qubit 106 and the control qubit 104 during the gate, as described herein.

Figure 6:
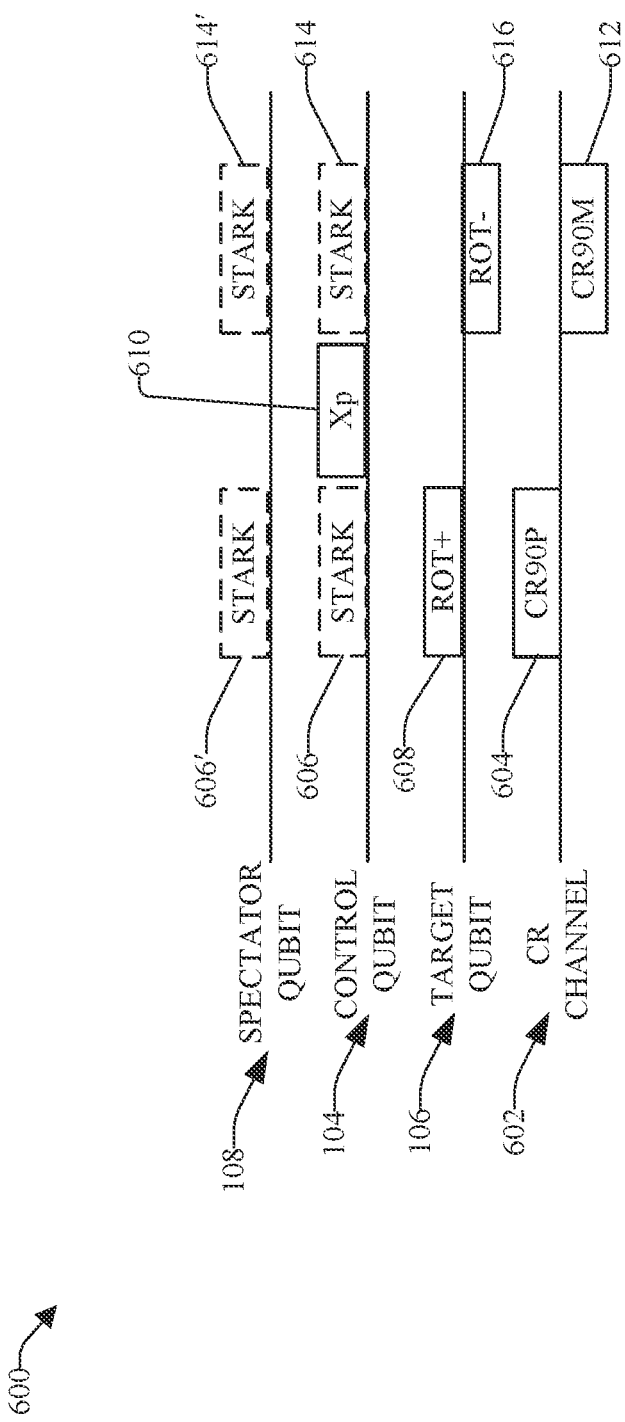
FIG. 6 presents a block diagram of an example cross-resonance gate that can employ rotary tone pulses, where stark tone pulses can be applied to a control qubit or spectator qubit to facilitate mitigating a collision between the control qubit and a target qubit, in accordance with various aspects and embodiments of the disclosed subject matter.

Referring to FIG. 6 (along with FIGS. 1 and 3), FIG. 6 presents a block diagram of an example cross-resonance gate 600 that can employ rotary tone pulses, where stark tone pulses can be applied to the control qubit 104 or the spectator qubit 108 to facilitate mitigating a collision between the control qubit 104 and target qubit 106, in accordance with various aspects and embodiments of the disclosed subject matter. In connection with the cross-resonance gate 600, there can be a control qubit 104, target qubit 106, spectator qubit 108, and CR channel 602, wherein at least some of them can have respective tone pulses applied to them at respective times of the cross-resonance gate 600. In addition to the tone pulse (e.g., Xp) shown as being applied to the control qubit 104, the signal (e.g., CR tone pulses) of the CR channel 602 also can be applied to the control qubit 104. As described herein, one property of the CR channel 602 can be that the frequency of the signal of the CR channel 602 can be at the frequency of the target qubit 106. The cross-resonance gate 600 can be similar in many ways to the cross-resonance gate 300 described with regard to FIG. 3, except that, with regard to the cross-resonance gate 600, the stark tone pulses can be applied to the control qubit 104 to stark shift the control qubit 104 or to the spectator qubit 108 to stark shift the spectator qubit 108, instead of applying stark tone pulses to the target qubit 106, such as described with regard to the cross-resonance gate 300 of FIG. 3 (although, in some embodiments, stark tone pulses can be applied to the target qubit 106 as well, if and as desired).

During a first time period (e.g., $t_1$) of the cross-resonance gate 600, the TMC 110 can control the TGC 112 to generate a desired CR tone pulse 604 (e.g., CR90P), which can have a positive (P) phase, a desired stark tone pulse 606 (e.g., stark) or stark tone pulse 606', and a desired rotary tone pulse 608 (e.g., ROT+), apply the desired CR tone pulse 604 via the CR channel 602 to the control qubit 104, apply (e.g., concurrently apply) the desired stark tone pulse 606 (e.g., off-resonant tone pulse) to the control qubit 104 or the stark tone pulse 606' to the spectator qubit 108, and apply (e.g., concurrently apply) the rotary tone pulse 608 to the target qubit 106. The application of the stark tone pulse 606 to the control qubit 104 can induce a stark shift (e.g., temporary stark shift) to the frequency of the control qubit 104 or the application of the stark tone pulse 606' to the spectator qubit 108 can induce a stark shift (e.g., temporary stark shift) to the frequency of the spectator qubit 108.

During a second time period (e.g., time period $t_2$ subsequent to time period $t_1$) of the cross-resonance gate 600, with the stark shift being induced at the control qubit 104 or the spectator qubit 108, the TMC 110 can control the TGC 112 to generate a desired tone pulse 610 (e.g., Xp) and apply the desired tone pulse 610 to the control qubit 104. The tone pulse 610 can perform a pi rotation of the control qubit 104 by the application of the tone pulse 610 at the transition frequency of the control qubit 104. The application of the desired tone pulse 610 to the control qubit 104 essentially can invert the state of the control qubit 104.

During a third time period (e.g., a time period $t_3$ subsequent to time period $t_2$) of the cross-resonance gate 600, after the desired tone pulse 610 (e.g., Xp) has been applied to the control qubit 104, the TMC 110 can control the TGC 112 to generate another desired CR tone pulse 612 (e.g., CR90M), which can have a negative or minus (M) phase, another desired stark tone pulse 614 (e.g., another off-resonant tone pulse) or other desired stark tone pulse 614', and another desired rotary tone pulse 616 (e.g., ROT−), apply this other desired CR tone pulse 612 via the CR channel 602 to the control qubit 104, apply (e.g., concurrently apply) the other desired stark tone pulse 614 to the control qubit 104 or the other desired stark tone pulse 614' to the spectator qubit 108, and apply (e.g., concurrently apply) the other desired rotary tone pulse 616 to the target qubit 106. This other CR tone pulse 612 (e.g., CR90M) can be 180 degrees out of phase with the CR tone pulse 304 (e.g., CR90P) to facilitate completion of the cross-resonance gate 600. The other rotary tone pulse 616 (e.g., ROT−) can be 180 degrees out of phase with the rotary tone pulse 608 (e.g., ROT+).

Similar to the stark tone pulse 606 or stark tone pulse 606' previously applied, the application of the stark tone pulse 614 to the control qubit 104 can induce a stark shift (e.g., temporary stark shift) to the frequency of the control qubit 104 or the application of the stark tone pulse 614' to the spectator qubit 108 can induce a stark shift (e.g., temporary stark shift) to the frequency of the spectator qubit 108. As described herein, the stark shifting of the frequency of the control qubit 104 or the frequency of the spectator qubit 108 during the cross-resonance gate 600 can desirably mitigate (e.g., reduce or eliminate) collision between the target qubit 106 and the control qubit 104 during the gate.

Figure 7:
FIG. 7 illustrates a block diagram of an example cross-resonance gate that can be a direct CNOT gate and can employ rotary tone pulses and an active cancellation pulse, where a stark tone pulse can be applied to a control qubit or spectator qubit to facilitate mitigating a collision between the control qubit and a target qubit, in accordance with various aspects and embodiments of the disclosed subject matter.

Turning to FIG. 7 (along with FIGS. 1 and 4), FIG. 7 illustrates a block diagram of an example cross-resonance gate 700 that can be a direct CNOT gate and can employ rotary tone pulses and an active cancellation pulse, where a stark tone pulse can be applied to the control qubit 104 or spectator qubit 108 to facilitate mitigating a collision between the control qubit 104 and target qubit 106, in accordance with various aspects and embodiments of the disclosed subject matter. In connection with the cross-resonance gate 700, there can be a control qubit 104, target qubit 106, spectator qubit 108, and CR channel 702, wherein at least some of them can have respective tone pulses applied to them at respective times of the cross-resonance gate 700. During the cross-resonance gate 700, the signal (e.g., tone pulse) of the CR channel 702 also can be applied to the control qubit 104. One property of the CR channel 702 can be that the frequency of the signal of the CR channel 702 can be at the frequency of the target qubit 106, such as described herein.

During a first time period (e.g., $t_1$) of the cross-resonance gate 700, the TMC 110 can control the TGC 112 to generate a desired CR tone pulse 704 (e.g., CR), a desired stark tone pulse 706 (e.g., stark) or stark tone pulse 706', a desired rotary tone pulse 708 (e.g., ROT+), and a desired active cancellation pulse 710, apply the desired CR tone pulse 704 via the CR channel 702 to the control qubit 104, apply the desired stark tone pulse 706 to the control qubit 104 or stark tone pulse 706' to the spectator qubit 108, and apply desired rotary tone pulse 708 and active cancellation pulse 710 to the target qubit 106. The stark tone pulse 706 or stark tone pulse 706' can be applied to the control qubit 104 or spectator qubit 108, respectively, and the rotary tone pulse 708 and active cancellation pulse 710 can be applied to the target qubit 106, concurrently or substantially concurrently with the application of the CR tone pulse 704 to the control qubit 104. The respective lengths (e.g., pulse lengths) of the CR tone pulse 704, stark tone pulse 706 or stark tone pulse 706', rotary tone pulse 708, and active cancellation pulse 710 can be determined (e.g., by the TMC 110), in accordance with the defined tone management criteria, wherein the pulse lengths of the CR tone pulse 704, stark tone pulse 706 or stark tone pulse 706', and active cancellation pulse 710 typically can correspond to each other and can extend from the beginning of the first time period (e.g., $t_1$) through the end of the second time period (e.g., $t_2$), whereas the rotary tone pulse 708 typically can have a pulse length that can extend for or correspond to the length of the first time period.

During a second time period (e.g., a time period $t_2$ subsequent to time period $t_1$) of the cross-resonance gate 700 (e.g., direct CNOT gate), the TMC 110 can control the TGC 112 to generate another desired another desired rotary tone pulse 712 (e.g., ROT−), apply this other desired rotary tone pulse 712 to the target qubit 106 while CR tone pulse 704 continues to be applied to the control qubit 104, the stark tone pulse 706 continues to be applied to the control qubit 104 or the stark tone pulse 706' continues to be applied to the spectator qubit 108, and the active cancellation pulse 410 continues to be applied to the target qubit 106. This other rotary tone pulse 712 (e.g., ROT−) can be 180 degrees out of phase with the rotary tone pulse 708 (e.g., ROT+). As described herein, it can be desirable for the rotary tone pulses to have phase coherence pulse-to-pulse (e.g., for the rotary tone pulse 712 to have phase coherence with rotary tone pulse 708).

The application of the stark tone pulse 706 to the control qubit 104 can induce a stark shift (e.g., temporary stark shift) to the frequency of the control qubit 104 or the application of the stark tone pulse 706' to the spectator qubit 108 can induce a stark shift (e.g., temporary stark shift) to the frequency of the spectator qubit 108, such as described herein. The stark shifting of the frequency of the target qubit 106 during the cross-resonance gate 700 can desirably mitigate (e.g., reduce or eliminate) collision between the target qubit 106 and the control qubit 104 during the gate, such as described herein.

The disclosed subject matter, by employing the TMC 110 and discrete stark pulse tones of defined pulse lengths to stark shift frequencies of qubits, instead of performing continuous stark shifting of frequencies of qubits, can desirably (e.g., suitably, acceptably, efficiently, or optimally) mitigate frequency collisions (e.g., cross-resonance collisions) associated with qubits more efficiently and can enhance (e.g., improve, increase, or optimize) performance of qubits and quantum operations. In some embodiments, the TMC 110 can determine, adjust, and generate tone pulses, including stark tone pulses (e.g., to stark shift a frequency of a qubit), having desired characteristics (e.g., frequency, amplitude, power, pulse length, or other characteristics) using reduced (or without additional) electronics, wiring, or other components or circuitry in the cryostat and/or outside the cryostat, as compared to traditional techniques or systems. For instance, the disclosed subject matter (e.g., the TMC 110) can utilize software (e.g., software components) to determine, adjust, and/or generate tone pulses, such as stark tone pulses, having desired characteristics. The disclosed subject matter can thereby reduce the amount of heat that is introduced or dissipated into the cryostat and can enhance the performance and efficiency of qubits and the quantum computer overall.

In other embodiments, even if additional electronics are employed inside or outside the cryostat to facilitate generating and applying tone pulses, the TMC 110 can determine and generate discrete tone pulses, such as discrete stark tone pulses (e.g., to stark shift a frequency of a qubit), having desired characteristics, as opposed to performing continuous stark shifting of frequencies of qubits, can enhance performance of qubits and the quantum computer overall. For instance, the disclosed subject matter, by employing discrete stark tone pulses to stark shift a frequency of a qubit, can thereby reduce the amount of heat that is introduced or dissipated into the cryostat and can enhance the performance and efficiency of qubits and the quantum computer overall, as compared to traditional techniques or systems.

Figure 8:
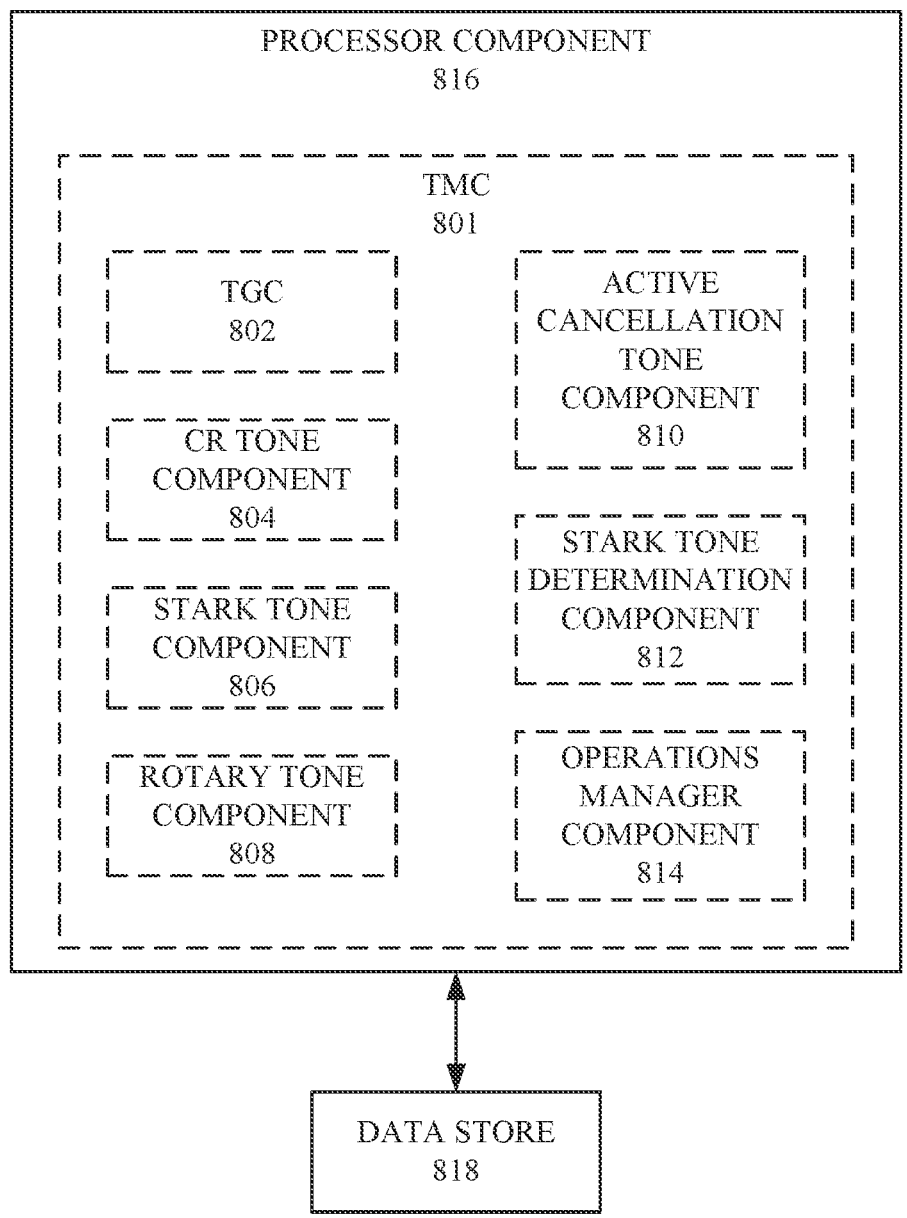
FIG. 8 depicts a block diagram of an example system that can comprise a tone management component that can control application of pulses to qubits to mitigate undesirable frequency collisions associated with qubits of a quantum computer component, in accordance with various aspects and embodiments of the disclosed subject matter.

FIG. 8 depicts a block diagram of an example system 800 that can comprise a TMC 801 that can control application of pulses to qubits to mitigate undesirable frequency collisions (e.g., cross-resonance collisions) associated with qubits of a quantum computer component, in accordance with various aspects and embodiments of the disclosed subject matter. The TMC 801 can comprise a TGC 802, a CR tone component 804, a stark tone component 806, a rotary tone component 808, an active cancellation tone component 810, a stark tone determination component 812, and an operations manager component 814. The system 800 can further comprise a processor component 816 and a data store 818.

The TGC 802 can generate desired tone pulses of various types (e.g., CR tone pulses, off-resonant tone or stark tone pulses, rotary tone pulses, or active cancellation tone pulses), and can apply respective tone pulses to the CR channel or desired qubits, as controlled by the TMC 801, and as more fully described herein. The respective pulses can have respective characteristics, such as pulse length of a pulse, a timing of the application of the pulse to a qubit, a frequency of the tone pulse, a power (e.g., an amount or level of power) of the pulse, an amplitude of the pulse, and/or other desired characteristics or features of the pulse, in accordance with the defined tone management criteria.

The CR tone component 804 can be utilized to determine or facilitate determining CR tones (e.g., CR tone pulses), including CR tone characteristics of such CR tones, that can be applied to a control qubit via a CR channel at respective times and under respective conditions to perform desired quantum operations. In some embodiments, the CR tone component 804 can comprise or utilize information relating to CR tones and characteristics, and can determine or facilitate determining CR tones and characteristics to be used during a particular gate based at least in part on an analysis of the information relating to CR tones and characteristics, the conditions under which a CR tone is to be applied to a control qubit, a type of gate (e.g., cross-resonance gate, two-qubit gate, or measurement gate) being utilized, and/or a quantum operation that is to be performed in connection with application of the CR tone to the control qubit.

The stark tone component 806 can be utilized to determine or facilitate determining stark tones (e.g., stark tone or off-resonant pulses), including stark tone characteristics of such stark tones, that can be applied to a qubit (e.g., target qubit, control qubit, or spectator qubit) at respective times and under respective conditions to perform desired quantum operations. In some embodiments, the stark tone component 806 can comprise or utilize information relating to stark tones and characteristics, and can determine or facilitate determining stark tones and characteristics to be used during a particular gate based at least in part on an analysis of the information relating to stark tones and characteristics, the conditions under which a stark tone(s) is to be applied to a qubit(s), a type of qubit(s) to which the stark tone(s) is to be applied, a type of gate being utilized, and/or a quantum operation that is to be performed in connection with application of the stark tone(s) to the qubit(s).

The rotary tone component 808 can be utilized to determine or facilitate determining rotary tones (e.g., rotary tone pulses), including rotary tone characteristics of such rotary tones, that can be applied to target qubits at respective times and under respective conditions to perform desired quantum operations. In some embodiments, the rotary tone component 808 can comprise or utilize information relating to rotary tones and characteristics, and can determine or facilitate determining rotary tones and characteristics to be used during a particular gate based at least in part on an analysis of the information relating to rotary tones and characteristics, the conditions under which a rotary tone is to be applied to a target qubit, the type of gate being utilized, and/or a quantum operation that is to be performed in connection with application of the rotary tone to the target qubit.

The active cancellation tone component 810 can be utilized to determine or facilitate determining active cancellation tones (e.g., active cancellation tone pulses), including active cancellation tone characteristics of such active cancellation tones, that can be applied to target qubits at respective times and under respective conditions to perform desired quantum operations. In some embodiments, the active cancellation tone component 810 can comprise or utilize information relating to active cancellation tones and characteristics, and can determine or facilitate determining active cancellation tones and characteristics to be used during a particular gate based at least in part on an analysis of the information relating to active cancellation tones and characteristics, the conditions under which an active cancellation tone is to be applied to a target qubit, the type of gate being utilized, and/or a quantum operation that is to be performed in connection with application of the active cancellation tone to the target qubit.

The stark tone determination component 812 can perform a stark tone determination procedure to determine desired stark tones (e.g., stark tone pulses) and associated desired frequencies (e.g., target frequencies) that can be used for qubits (e.g., target qubit) to facilitate mitigating various types of collisions between the control qubit and another associated qubit(s) (e.g., target qubit). In some embodiments, with regard to each type of collision to be considered, the stark tone determination component 812 can adjust the frequency (e.g., target frequency) and power of the stark tone (e.g., off-resonant tone) to achieve a desired frequency (e.g., target frequency) that can be separated from the collision by a desired keepout (e.g., that can be separated from the collision by a defined separation amount of frequency). With regard to each type of collision, the stark tone determination component 812 can adjust the frequency of the CR tone (e.g., CR tone pulse) to the stark-shifted target frequency, and can perform a fine adjustment of the frequency of the CR tone to eliminate or reduce an IZ error to within a defined threshold tolerance amount of IZ error, in accordance with the defined tone management criteria, which can indicate what amount of IZ error is permitted to be tolerated. With regard to each type of collision, the stark tone determination component 812 can calibrate the cross-resonance gate using a desired calibration process. With regard to each type of collision, the stark tone determination component 812 also can evaluate the fidelity of the stark tone and associated target frequency, and, as desired, can iterate over potential target frequencies until the desired (e.g., acceptable, suitable, or optimal) target frequency is achieved, in accordance with defined tone management criteria.

The operations manager component 814 that can control (e.g., manage) operations associated with the TMC 801. For example, the operations manager component 814 can facilitate generating instructions to have components of the TMC 801 perform operations, and can communicate instructions to components (e.g., TGC 802, CR tone component 804, stark tone component 806, rotary tone component 808, active cancellation tone component 810, stark tone determination component 812, processor component 816, and data store 818) of the system 800 to facilitate performance of operations by the components of the system 800 based at least in part on the instructions, in accordance with the defined tone management criteria, defined tone management algorithms (e.g., tone management algorithms as disclosed, defined, recited, embodied or indicated herein by the methods, systems, and techniques described herein). The operations manager component 814 also can facilitate controlling data flow between the components of the system 800 and controlling data flow between the system 800 and another component(s) or device(s) (e.g., quantum computer component, interface component, computer, laptop computer, or other type of computing and/or communication device) associated with (e.g., connected to) the system 800.

The processor component 816 can work in conjunction with the other components (e.g., TMC 801, TGC 802, CR tone component 804, stark tone component 806, rotary tone component 808, active cancellation tone component 810, stark tone determination component 812, operations manager component 814, data store 818, or other component) to facilitate performing the various functions of the system 800. The processor component 816 can employ one or more processors, microprocessors, or controllers that can process data, such as information relating to qubits, circuits (e.g., quantum circuitry), quantum operations, gates, tone pulses, stark shifting, functions, algorithms (e.g., algorithms as indicated or defined by the processes, protocols, methods, and/or techniques described herein; and/or quantum algorithms), quantum logic, defined tone management criteria, traffic flows, policies, protocols, interfaces, tools, and/or other information, to facilitate operation of the system 800, as more fully disclosed herein, and control data flow between the system 800 and other components (e.g., quantum computer component 102, quantum programs, data storage devices, user devices or end-point devices, computers, interface components, or other computing or communication devices) associated with (e.g., connected to) the system 800.

The data store 818 can store data structures (e.g., user data, metadata), code structure(s) (e.g., modules, objects, hashes, classes, procedures) or instructions, information relating to qubits, circuits (e.g., quantum circuitry), quantum operations, gates, tone pulses, stark shifting, functions, algorithms (e.g., algorithms as indicated or defined by the processes, protocols, methods, and/or techniques described herein; and/or quantum algorithms), quantum logic, defined tone management criteria, traffic flows, policies, protocols, interfaces, tools, and/or other information, to facilitate controlling operations associated with the system 800. In an aspect, the processor component 816 can be functionally coupled (e.g., through a memory bus) to the data store 818 in order to store and retrieve information desired to operate and/or confer functionality, at least in part, to the TMC 801, TGC 802, CR tone component 804, stark tone component 806, rotary tone component 808, active cancellation tone component 810, stark tone determination component 812, operations manager component 814, processor component 816, data store 818, or other component, and/or substantially any other operational aspects of the system 800.

The systems and/or devices have been (or will be) described herein with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

Figure 9:
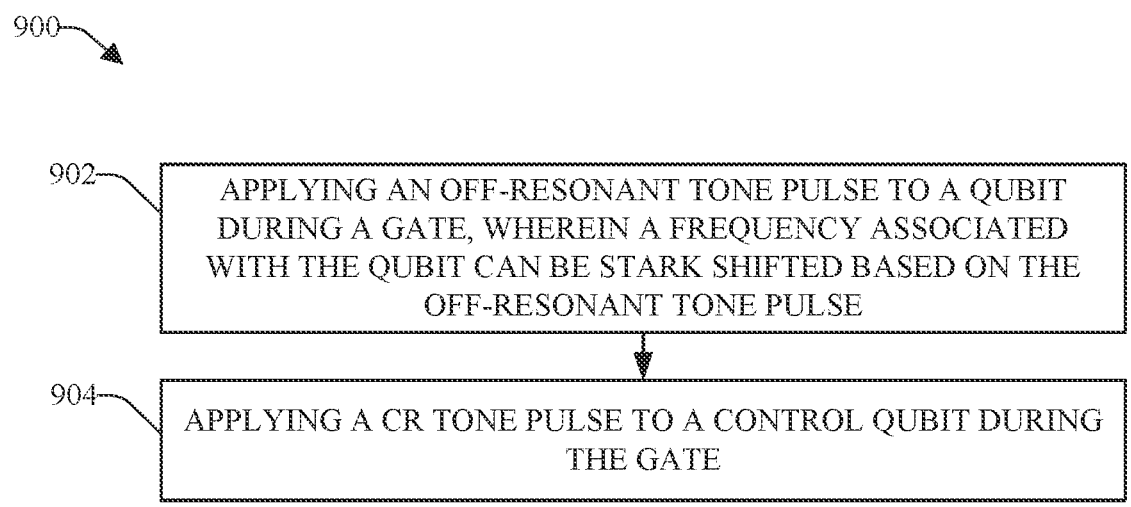
FIG. 9 illustrates a flow diagram of an example, non-limiting method that can desirably mitigate frequency collisions associated with qubits of a quantum computer, in accordance with various aspects and embodiments of the disclosed subject matter.

FIG. 9 illustrates a flow diagram of an example, non-limiting method 900 that can desirably mitigate frequency collisions associated with qubits of a quantum computer, in accordance with various aspects and embodiments of the disclosed subject matter. In some embodiments, the method 900 can be performed by, for example, the TMC and/or a processor component, which can be associated with a data store. Repetitive description of like elements employed in other embodiments described herein is or may be omitted for sake of brevity.

At 902, an off-resonant tone pulse can be applied to a qubit during a gate, wherein a frequency associated with the qubit can be stark shifted based on the off-resonant tone pulse. The TMC can apply the off-resonant tone pulse (e.g., stark tone pulse) having a desired (e.g., suitable, appropriate, or optimal) frequency to the qubit during the gate, wherein the frequency associated with the qubit can be stark shifted based on the off-resonant tone pulse. The qubit can be a target qubit, a control qubit, or a spectator qubit, such as described herein. The gate can be a cross-resonance gate, two-qubit gate, or measurement gate.

At 904, a CR tone pulse can be applied to a control qubit during the gate. The TMC can apply the CR tone pulse to the control qubit, via the CR channel, during the gate, wherein the off-resonant tone pulse can be applied to the qubit concurrently with the applying of the CR tone pulse to the control qubit. In the case where the qubit is the target qubit, the application of the CR tone pulse to the control qubit can be at the frequency (e.g., stark-shifted target frequency) associated with the target qubit. In accordance with various embodiments, the method 900 can be utilized, or adapted to be utilized, with regard to a gate that can utilize an echo sequence, rotary tone pulses, or active cancellation pulses, such as more fully described herein.

Figure 10:
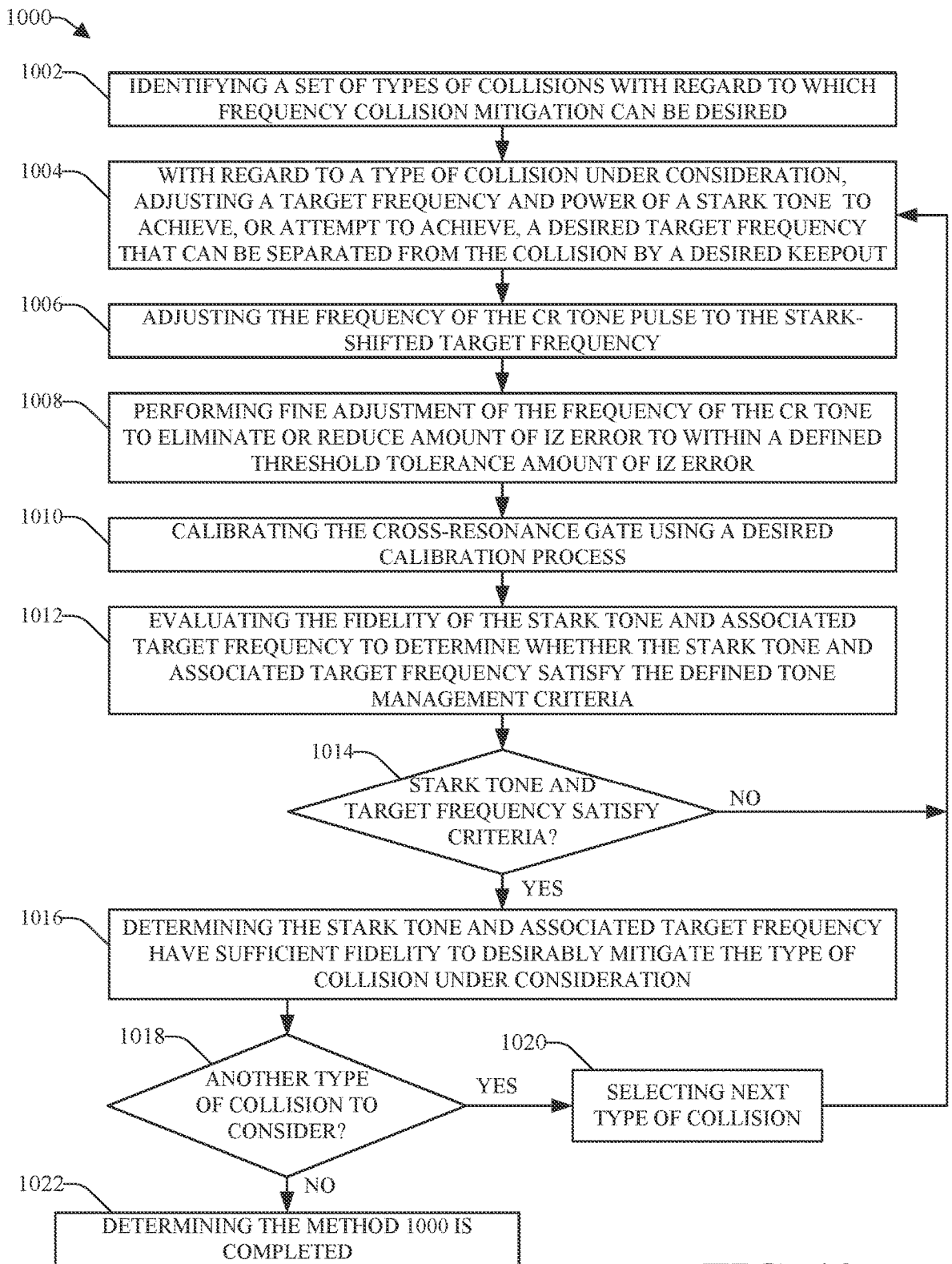
FIG. 10 depicts a flow diagram of another example, non-limiting method that can determine desirable stark tone pulses to facilitate desirably mitigating frequency collisions associated with qubits of a quantum computer, in accordance with various aspects and embodiments of the disclosed subject matter.

FIG. 10 depicts a flow diagram of an example, non-limiting method 1000 that can determine desirable stark tone pulses to facilitate desirably mitigating frequency collisions associated with qubits of a quantum computer, in accordance with various aspects and embodiments of the disclosed subject matter. The method 1000 can be performed by, for example, the TMC and/or a processor component, which can be associated with a data store. Repetitive description of like elements employed in other embodiments described herein is or may be omitted for sake of brevity.

At 1002, a set of types of collisions, with regard to which frequency collision mitigation can be desired, can be identified. The TMC can identify or determine the set of types of collisions, comprising one or more types of collisions, for which frequency collision mitigation can be desired. The set of types of collisions can comprise, for example, the second type of collision, the third type of collision, the fourth type of collision, the fifth type of collision, the sixth type of collision, and/or the seventh type of collision, such as more fully described herein.

At 1004, with regard to a type of collision under consideration, a target frequency and power of a stark tone can be adjusted to achieve, or at least attempt to achieve, a desired target frequency that can be separated from the collision by a desired keepout (e.g., frequency keepout). With regard to a type of collision under consideration, the TMC (e.g., employing the stark tone determination component) can adjust the target frequency and power (e.g., power level) of the stark tone (e.g., off-resonant tone) to achieve, or at least attempt to achieve, a desired target frequency that can be separated from the collision by a desired keepout (e.g., that can be separated from the collision by a defined separation amount of frequency or defined frequency buffer amount), such as described herein.

At 1006, with regard to the type of collision under consideration, the frequency of the CR tone pulse can be adjusted to the stark-shifted target frequency. At 1008, with regard to the type of collision under consideration, a fine adjustment of the frequency of the CR tone can be performed to eliminate or reduce an amount of IZ error to within a defined threshold tolerance amount of IZ error. With regard to the type of collision under consideration, the TMC (e.g., employing the stark tone determination component) can adjust the frequency of the CR tone pulse to the stark-shifted target frequency (e.g., target frequency of a target qubit when the target qubit is stark shifted based on the stark tone), and can perform a fine adjustment of the frequency of the CR tone to eliminate or reduce an amount of IZ error to within a defined threshold tolerance amount of IZ error, in accordance with the defined tone management criteria, which can indicate what amount of IZ error is permitted to be tolerated.

At 1010, with regard to the type of collision under consideration, the cross-resonance gate can be calibrated using a desired calibration process. With regard to the type of collision under consideration, the TMC (e.g., employing the stark tone determination component) can calibrate the cross-resonance gate using the desired calibration process.

At 1012, with regard to the type of collision under consideration, the fidelity of the stark tone and associated target frequency can be evaluated to determine whether the stark tone and associated target frequency satisfy the defined tone management criteria. At 1014, a determination can be made regarding whether the stark tone and associated target frequency satisfy the defined tone management criteria. With regard to the type of collision under consideration, the TMC (e.g., employing the stark tone determination component) can evaluate the fidelity of the stark tone and associated target frequency, to determine whether the stark tone and associated target frequency satisfy the defined tone management criteria, which can indicate or specify when the fidelity of the stark tone and associated target frequency is sufficiently high enough to desirably (e.g., suitably, acceptably, or optimally) mitigate the type of collision under consideration.

With regard to the type of collision under consideration, in response to determining that the stark tone and associated target frequency do not satisfy the defined tone management criteria based on the results of the evaluation, the method 1000 can return to reference numeral 1004 where the target frequency and power of the stark tone can be adjusted to achieve, or at least attempt to achieve, the desired target frequency (and power) of a stark tone that can satisfy (e.g., meet or exceed the conditions or thresholds of) the defined tone management criteria, and the method 1000 can proceed from that point. As desired, the TMC can iterate over potential target frequencies (and potential power levels) of stark tones until the desired (e.g., acceptable, suitable, or optimal) target frequency (and power level) of a stark tone is determined to satisfy the defined tone management criteria.

Referring again to reference numeral, 1014, if, at 1014, it is determined that the stark tone and associated target frequency satisfy the defined tone management criteria based on the results of the evaluation, at 1016, a determination can be made that the stark tone and associated target frequency have sufficient fidelity to desirably mitigate the type of collision under consideration. With regard to the type of collision under consideration, in response to determining that the stark tone and associated target frequency satisfy the defined tone management criteria based on the results of the evaluation, the TMC (e.g., employing the stark tone determination component) can determine that the stark tone and associated target frequency have sufficient fidelity to desirably mitigate the type of collision under consideration. The TMC can utilize the stark tone and associated target frequency during gates where it can be desired to mitigate that type of collision.

At 1018, a determination can be made regarding whether there is another type of collision to consider. The TMC can determine whether there is another type of collision in the set of types of collisions to consider. If the TMC determines that there is another type of collision to consider, at 1020, a next type of collision of the set of types of collisions can be selected, and the method 1000 can return to reference numeral 1004 where a target frequency and power of the stark tone can be adjusted to achieve, or at least attempt to achieve, a desired target frequency (and power) of a stark tone that can satisfy (e.g., meet or exceed the conditions or thresholds of) the defined tone management criteria with regard to that next type of collision that is under consideration, and the method 1000 can proceed from that point.

Referring again to reference numeral 1018, if, at 1018, it is determined that no other types of collisions remain to be considered, at 1022, it can be determined that the method 1000 is completed. If the TMC determines that there is no other type of collision that is left to be considered, the TMC can determine that the method 1000 (e.g., stark tone determination process) is completed.

For simplicity of explanation, the methods and/or computer-implemented methods are depicted and described as a series of acts. It is to be understood and appreciated that the disclosed subject matter is not limited by the acts illustrated and/or by the order of acts, for example acts can occur in various orders and/or concurrently, and with other acts not presented and described herein. Furthermore, not all illustrated acts can be required to implement the computer-implemented methods in accordance with the disclosed subject matter. In addition, those skilled in the art will understand and appreciate that the computer-implemented methods could alternatively be represented as a series of interrelated states via a state diagram or events. Additionally, it should be further appreciated that the computer-implemented methods disclosed hereinafter and throughout this specification are capable of being stored on an article of manufacture to facilitate transporting and transferring such computer-implemented methods to computers. The term article of manufacture, as used herein, is intended to encompass a computer program accessible from any computer-readable device or storage media.

Figure 11:
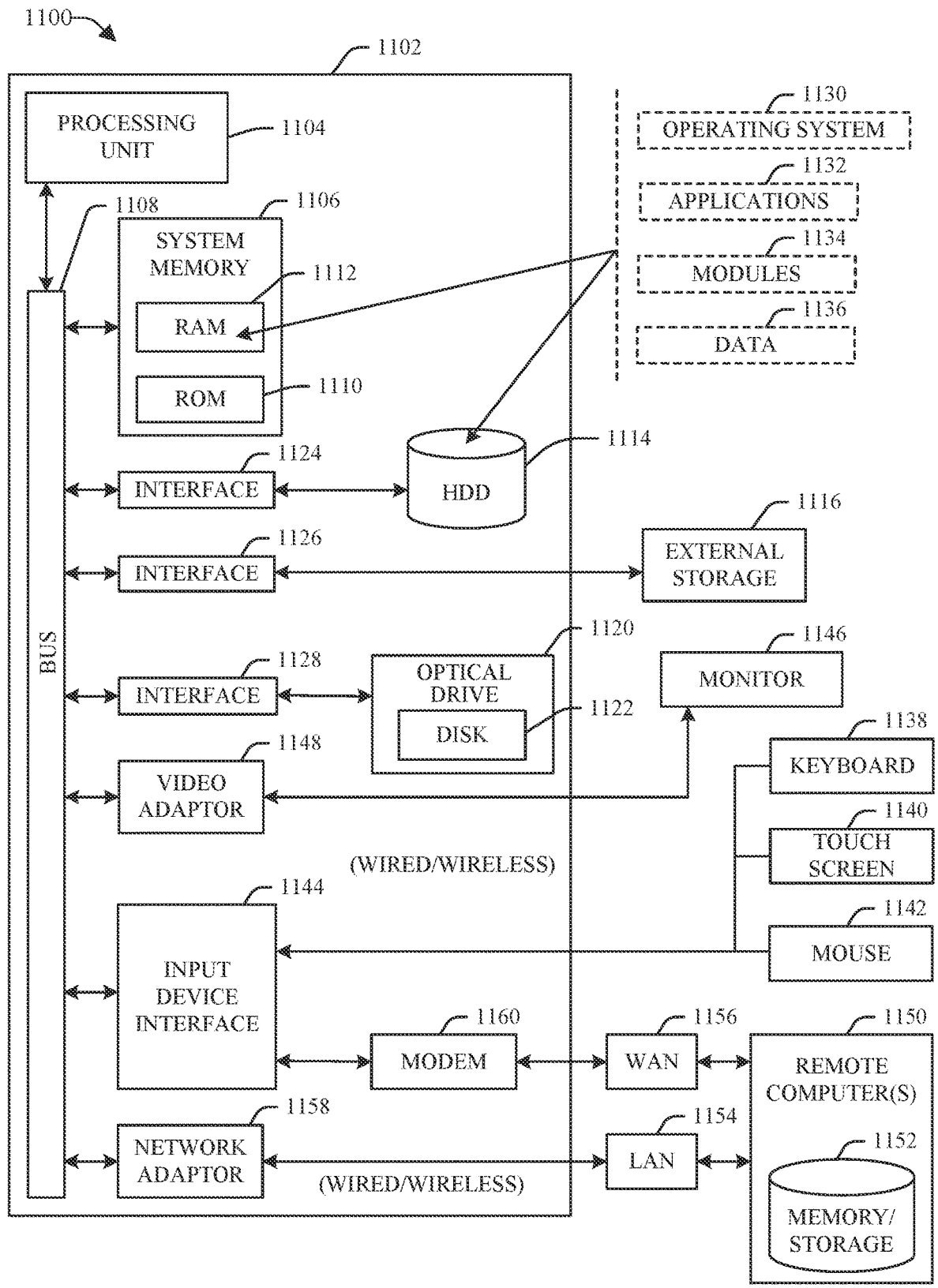
FIG. 11 illustrates a block diagram of an example, non-limiting operating environment in which one or more embodiments described herein can be facilitated.

In order to provide additional context for various embodiments described herein, FIG. 11 and the following discussion are intended to provide a general description of a suitable computing environment 1100 in which the various embodiments of the embodiments described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, or other type of program modules, that can perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments of the aspects described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a non-volatile memory such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 (e.g., EIDE, SATA), one or more external storage devices 1116 (e.g., a magnetic floppy disk drive (FDD) 1116, a memory stick or flash drive reader, a memory card reader, or other type of external storage device) and an optical disk drive 1120 (e.g., which can read or write from a CD-ROM disc, a DVD, a BD, or other type of optical disk drive). While the internal HDD 1114 is illustrated as located within the computer 1102, the internal HDD 1114 can also be configured for external use in a suitable chassis (not shown). Additionally, while not shown in environment 1100, a solid state drive (SSD) could be used in addition to, or in place of, an HDD 1114. The HDD 1114, external storage device(s) 1116 and optical disk drive 1120 can be connected to the system bus 1108 by an HDD interface 1124, an external storage interface 1126 and an optical drive interface 1128, respectively. The interface 1124 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can comprise one virtual machine (VM) of multiple VMs hosted at computer 1102. Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, standalone, executable packages of software that include, e.g., code, runtime, system tools, system libraries and settings for an application.

Further, computer 1102 can be enable with a security module, such as a trusted processing module (TPM). For instance with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1394 serial port, a game port, a USB port, an IR interface, a BLUETOOTH™ interface, or other type of interface.

A monitor 1146 or other type of display device can be also connected to the system bus 1108 via an interface, such as a video adapter 1148. In addition to the monitor 1146, a computer typically includes other peripheral output devices (not shown), such as speakers, printers, or other type of peripheral output device.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the Internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are example and other means of establishing a communications link between the computers can be used.

When used in either a LAN or WAN networking environment, the computer 1102 can access cloud storage systems or other network-based storage systems in addition to, or in place of, external storage devices 1116 as described above. Generally, a connection between the computer 1102 and a cloud storage system can be established over a LAN 1154 or WAN 1156, e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, or other type of wirelessly detectable tag), and telephone. This can include Wireless Fidelity (Wi-Fi) and BLUETOOTH™ wireless technologies. Thus, the communication can be a predefined structure as with a conventional network or simply an ad hoc communication between at least two devices.

Wi-Fi, or Wireless Fidelity, allows connection to the Internet from a couch at home, in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, or other version of IEEE 802.11) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

It is to be noted that aspects, features, and/or advantages of the disclosed subject matter can be exploited in substantially any wireless telecommunication or radio technology, e.g., Wi-Fi; Gi-Fi; Hi-Fi; BLUETOOTH™; worldwide interoperability for microwave access (WiMAX); enhanced general packet radio service (enhanced GPRS); third generation partnership project (3GPP) long term evolution (LTE); third generation partnership project 2 (3GPP2) ultra mobile broadband (UMB); 3GPP universal mobile telecommunication system (UMTS); high speed packet access (HSPA); high speed downlink packet access (HSDPA); high speed uplink packet access (HSUPA); GSM (global system for mobile communications) EDGE (enhanced data rates for GSM evolution) radio access network (GERAN); UMTS terrestrial radio access network (UTRAN); LTE advanced (LTE-A); or other type of wireless telecommunication or radio technology. Additionally, some or all of the aspects described herein can be exploited in legacy telecommunication technologies, e.g., GSM. In addition, mobile as well non-mobile networks (e.g., the internet, data service network such as internet protocol television (IPTV), or other type of non-mobile network) can exploit aspects or features described herein.

One or more embodiments can be a system, a method, an apparatus and/or a computer program product at any possible technical detail level of integration. The computer program product can include a computer readable storage medium (or media) having computer readable program instructions thereon for causing a processor to carry out aspects of the one or more embodiments. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the disclosed subject matter can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the disclosed subject matter.

Aspects of disclosed subject matter are described herein with reference to flowchart illustrations and/or block diagrams of methods, apparatus (systems), and computer program products according to embodiments of the subject disclosure. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create method for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the disclosed subject matter. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can be implemented in combination with other program modules. Generally, program modules include routines, programs, components, data structures, etc. that perform particular tasks and/or implement particular abstract data types. Moreover, those skilled in the art will appreciate that the computer-implemented methods disclosed herein can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other method to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM)). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has,"

"possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
    applying, by a system operatively coupled to a processor component, an off-resonant tone pulse and a rotary tone pulse to a qubit during application of a gate, wherein a frequency associated with the qubit is stark shifted based on the off-resonant tone pulse, wherein the rotary tone pulse is at the frequency that is stark shifted based on the off-resonant tone pulse, and wherein the qubit is a target qubit, a control qubit, or another qubit; and
    applying, by the system, a cross-resonance tone pulse to the control qubit during the application of the gate.

2. The computer-implemented method of claim 1, wherein the applying of the off-resonant tone pulse to the qubit during the application of the gate induces the stark shifting of the frequency, and wherein the frequency is a qubit transition frequency.

3. The computer-implemented method of claim 1, wherein the other qubit is coupled to the target qubit or the control qubit.

4. The computer-implemented method of claim 1, wherein collisions in the gate are mitigated based on the applying of the off-resonant tone pulse to the qubit during the application of the gate or the applying of the cross-resonance tone pulse to the control qubit at the frequency that is stark shifted based on the off-resonant tone pulse, and wherein the gate is a cross-resonance gate, a two-qubit gate, or a measurement gate.

5. The computer-implemented method of claim 1, wherein the gate utilizes an echo sequence, wherein the qubit is the target qubit, and wherein the applying of the cross-resonance tone pulse to the control qubit during the application of the gate comprises applying the cross-resonance tone pulse to the control qubit at the frequency associated with the target qubit.

6. The computer-implemented method of claim 1, wherein the gate utilizes a target rotary, wherein the qubit is the target qubit, and wherein the applying of the cross-resonance tone pulse to the control qubit during the application of the gate comprises applying the cross-resonance tone pulse to the control qubit at the frequency associated with the target qubit.

7. The computer-implemented method of claim 1, wherein the gate utilizes a target rotary and active cancellation, wherein the gate is a direct controlled NOT gate, wherein the qubit is the target qubit, and wherein the method further comprises:
    applying, by the system, an active cancellation pulse to the target qubit during the application of the direct controlled NOT gate in association with the applying of the off resonant tone pulse and the rotary tone pulse, wherein the rotary tone pulse and the active cancellation pulse are at the frequency that is stark shifted based on the off-resonant tone pulse, and wherein the applying of the cross-resonance tone pulse to the control qubit during the application of the gate comprises applying the cross-resonance tone pulse to the control qubit at the frequency associated with the target qubit.

8. The computer-implemented method of claim 1, wherein the off-resonant tone pulse is a stark tone pulse, wherein the qubit is the target qubit, and wherein the method further comprises:
    identifying, by the system, a set of types of collisions associated with the target qubit and the control qubit;
    for each type of collision of the set of types of collisions, applying, by the system, a test stark tone pulse to the target qubit; and
    for each type of collision, adjusting, by the system, a test frequency or an amount of power of the test stark tone pulse, wherein the test frequency or the amount of power are adjusted to achieve a target frequency that is separated by a defined separation amount of frequency.

9. The computer-implemented method of claim 8, wherein the test frequency is a first frequency, wherein the gate is a cross-resonance gate, and wherein the method further comprises:
    for each type of collision:
        adjusting, by the system, a second frequency of the cross-resonance tone pulse to the first frequency that is stark shifted based on the test stark tone pulse;
        determining, by the system, whether an IZ gate error associated with the cross-resonance gate is less than a defined threshold error tolerance;
        in response to determining that the IZ gate error is not within the defined threshold error tolerance, modifying, by the system, the second frequency of the cross-resonance tone pulse to a third frequency to reduce the IZ gate error to less than the defined threshold error tolerance; and
        calibrating, by the system, the cross-resonance gate.

10. The computer-implemented method of claim 9, further comprising:
    for each type of collision:
        iteratively evaluating, by the system, a fidelity associated with the target qubit in relation to potential frequencies associated with the target qubit, wherein the potential frequencies comprise the first frequency; and
        determining, by the system, the frequency of the potential frequencies that satisfies a defined qubit fidelity criterion based on a result of the iterative evaluating of the fidelity associated with the target qubit, wherein the frequency is the first frequency or another frequency of the potential frequencies.

11. A system, comprising:
    a memory that stores computer-executable components; and
    a processor component, operatively coupled to the memory, that executes computer-executable components, the computer-executable components comprising:
        a tone generator component that applies an off-resonant tone pulse and a target rotary pulse to a qubit during application of a gate, wherein a frequency associated with the qubit is stark shifted based on the off-resonant tone pulse, wherein the rotary tone pulse is at the frequency that is stark shifted based on the off-resonant tone pulse, wherein the qubit is a target qubit, a control qubit, or another qubit, and wherein the tone generator component applies a cross-resonance tone pulse to the control qubit during the application of the gate.

12. The system of claim 11, wherein the application of the off-resonant tone pulse to the qubit during the application of the gate induces the stark shifting of the frequency, and wherein the frequency is a qubit transition frequency.

13. The system of claim 11, wherein the other qubit is coupled to the target qubit or the control qubit.

14. The system of claim 11, wherein collisions in the gate are mitigated based on the application of the off-resonant tone pulse to the qubit during the application of the gate or application of the cross-resonance tone pulse to the control qubit at the frequency that is stark shifted based on the off-resonant tone pulse, and wherein the gate is a cross-resonance gate, a two-qubit gate, or a measurement gate.

15. The system of claim 11, wherein the gate utilizes an echo sequence, wherein the qubit is the target qubit, and wherein the tone generator component applies the cross-resonance tone pulse to the control qubit at the frequency associated with the target qubit.

16. The system of claim 11, wherein the gate utilizes a target rotary,
and wherein the tone generator component applies the cross-resonance tone pulse to the control qubit at the frequency associated with the qubit.

17. The system of claim 11, wherein the gate utilizes a target rotary and active cancellation, wherein the gate is a direct controlled NOT gate, wherein the qubit is the target qubit,
wherein the tone generator component applies an active cancellation pulse to the target qubit during the application of the gate, wherein the rotary tone pulse and the active cancellation pulse are at the frequency that is stark shifted based on the off-resonant tone pulse, and
wherein the tone generator component applies the cross-resonance tone pulse to the control qubit at the frequency associated with the target qubit.

18. A non-transitory computer program product that facilitates mitigating cross-resonance collision associated with qubits, the computer program product comprising a computer readable storage medium having program instructions embodied therewith, the program instructions are executable by a processor component to cause the processor component to:
apply a stark tone pulse and a rotary pulse to a qubit during application of a gate, wherein a frequency associated with the qubit is stark shifted based on the stark tone pulse, wherein the rotary tone pulse is at the frequency that is stark shifted based on the shark tone pulse, and wherein the qubit is a target qubit, a control qubit, or a spectator qubit; and
apply a cross-resonance tone pulse to the control qubit during the application of the gate.

19. The non-transitory computer program product of claim 18, wherein the stark tone pulse is an off-resonant tone pulse, wherein the gate utilizes a target rotary, and wherein the cross-resonance tone pulse is applied to the control qubit at the frequency associated with the qubit.

20. The non-transitory computer program product of claim 18, wherein the spectator qubit is coupled to the target qubit or the control qubit, and wherein the gate is a cross-resonance gate, a two-qubit gate, or a measurement gate that utilizes an echo sequence, a target rotary, or active cancellation.

21. A system, comprising:
a control qubit coupled to a target qubit, wherein a qubit is driven by an off-resonant tone pulse and a rotary pulse applied to the qubit during application of a gate, wherein a frequency associated with the qubit is stark shifted based on the off-resonant tone pulse, wherein the rotary tone pulse is at the frequency that is stark shifted based on the off-resonant tone pulse, and wherein the qubit is the target qubit, the control qubit, or a spectator qubit coupled to the target qubit or the control qubit; and
wherein the control qubit is driven by a cross-resonance tone pulse at the frequency associated with the qubit during the application of the gate.

* * * * *